US010281791B2

(12) United States Patent
Xu

(10) Patent No.: US 10,281,791 B2
(45) Date of Patent: *May 7, 2019

(54) ELECTROCHROMIC DEVICE HAVING THREE-DIMENSIONAL ELECTRODE

(71) Applicant: Board of Trustees of Northern Illinois University, DeKalb, IL (US)

(72) Inventor: Tao Xu, Lisle, IL (US)

(73) Assignee: Board of Trustees of Northers Illinois University, DeKalb, IL (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/208,402

(22) Filed: Jul. 12, 2016

(65) Prior Publication Data
US 2017/0003565 A1  Jan. 5, 2017

Related U.S. Application Data

(63) Continuation of application No. 13/972,447, filed on Aug. 21, 2013, now Pat. No. 9,405,164.

(51) Int. Cl.
*G02F 1/155* (2006.01)
*G02F 1/153* (2006.01)
(Continued)

(52) U.S. Cl.
CPC ........ *G02F 1/155* (2013.01); *G02F 1/134309* (2013.01); *G02F 1/15* (2013.01); *G02F 1/153* (2013.01); *G02F 1/1521* (2013.01); *G02F 1/1533* (2013.01); *G02F 1/163* (2013.01); *G02F 1/1523* (2013.01); *G02F 1/1525* (2013.01); *G02F 2001/134318* (2013.01);
(Continued)

(58) Field of Classification Search
CPC .......... G02F 1/155; G02F 1/163; G02F 1/153; G02F 1/15; G02F 1/1523; G02F 2001/1515; G02F 1/1521; G02F 1/1533; G02F 2001/1519; G02F 2001/1555; G02F 2001/1512; G02F 2201/123
USPC .................................................. 359/265–275
See application file for complete search history.

(56) References Cited

U.S. PATENT DOCUMENTS 5,482,570 A   1/1996 Saurer et al.
6,245,988 B1  6/2001 Gratzel
(Continued)

FOREIGN PATENT DOCUMENTS

EP   1320782   12/2010
JP   5489497   7/1979
(Continued)

OTHER PUBLICATIONS

Yang, Z. et al., "Three-dimensional photonic crystal fluorinated tin oxide (FTO) electrodes: synthesis and optical and electrical properties", Applied Materials & Interfaces, vol. 3, pp. 1101-1108, (2011).
(Continued)

*Primary Examiner* — Evelyn A Lester
(74) *Attorney, Agent, or Firm* — Evan Law Group LLC

(57) ABSTRACT

An electrochromic device comprises (i) a conductive layer, (ii) an electrochromic material, on the conductive layer, (iii) an electrolyte, on the electrochromic material, and (iv) a counter-electrode, on the electrolyte. The conductive layer has a surface roughness factor (SRF) of at least 10, and the conductive layer comprises a semi-metal.

23 Claims, 8 Drawing Sheets

(51) Int. Cl.
  *G02F 1/163* (2006.01)
  *G02F 1/1343* (2006.01)
  *G02F 1/15* (2019.01)
  *G02F 1/1523* (2019.01)

(52) U.S. Cl.
  CPC ............ *G02F 2001/1512* (2013.01); *G02F 2001/1515* (2013.01); *G02F 2001/1519* (2013.01); *G02F 2001/1555* (2013.01); *G02F 2201/123* (2013.01)

(56) References Cited

U.S. PATENT DOCUMENTS

| | | | |
|---|---|---|---|
| 6,278,056 | B1 | 8/2001 | Sugihara et al. |
| 7,145,071 | B2 | 12/2006 | Spivack et al. |
| 9,129,751 | B2 | 9/2015 | Xu |
| 9,405,164 | B2 | 8/2016 | Xu |
| 2003/0000568 | A1 | 1/2003 | Gonsiorawski |
| 2003/0230337 | A1 | 12/2003 | Gaudiana et al. |
| 2004/0131934 | A1 | 7/2004 | Sugnaux et al. |
| 2005/0072458 | A1 | 4/2005 | Goldstein |
| 2005/0109391 | A1 | 5/2005 | Kobayashi |
| 2005/0175939 | A1 | 8/2005 | Perlo et al. |
| 2005/0218381 | A1 | 10/2005 | Maruyama et al. |
| 2005/0274888 | A1 | 12/2005 | Darling et al. |
| 2007/0217784 | A1* | 9/2007 | Kaneiwa et al. ............ 396/506 |
| 2008/0149171 | A1 | 6/2008 | Lu et al. |
| 2008/0308156 | A1 | 12/2008 | Boyer, Jr. |
| 2009/0202880 | A1 | 8/2009 | Ge et al. |
| 2009/0211630 | A1 | 8/2009 | Yun et al. |
| 2011/0073172 | A1 | 3/2011 | LeSuer et al. |
| 2011/0214730 | A1 | 9/2011 | Kobayashi et al. |
| 2011/0220192 | A1 | 9/2011 | Tajabadi et al. |
| 2011/0232736 | A1 | 9/2011 | Goldstein et al. |
| 2011/0232759 | A1 | 9/2011 | Xu |
| 2013/0065130 | A1 | 3/2013 | Ban et al. |
| 2013/0160855 | A1 | 6/2013 | Gibson et al. |
| 2013/0327386 | A1 | 12/2013 | Xu |
| 2015/0055206 | A1 | 2/2015 | Xu |

FOREIGN PATENT DOCUMENTS

| | | |
|---|---|---|
| JP | 5710122 | 1/1982 |
| JP | 5830731 | 2/1983 |
| JP | 61254935 | 11/1986 |
| WO | 2009/027977 | 3/2009 |
| WO | 2012/001033 | 1/2012 |

OTHER PUBLICATIONS

Yang, Z. et al., "Enhanced electron extraction from template-free 3D nanoparticulate transparent conducting oxide (TCO) electrodes for dye-sensitized solar cells", Applied Materials & Interfaces, vol. 4, pp. 4419-4427, (2012).
Yang, Z. et al., "Enhanced electron collection in $TiO_2$ nanoparticle-based dye-sensitized solar cells by an array of metal micropillars on a planar fluorinated tin oxide anode", Journal of Physical Chemistry C, vol. 114, No. 44, pp. 19151-19156, (2010).
Lin, C. et al., "An in situ electrical study on primary hydrogen spillover from nanocatalysts to amorphous carbon support", Applied Physics Letters, vol. 93, pp. 233110-1-233110-3, (2008).
Yang, Z. et al., "Enhanced electron transport in dye-sensitized solar cells using short ZnO nanotips on a rough metal anode", The Journal of Physical Chemistry C, vol. 113, No. 47, pp. 20521-20526, (2009).
Gratzel, M., "Photoelectrochemical cells", Nature, vol. 414, pp. 338-344, (2001).
Hamann, T.W. et al., "Advancing beyond current generation dye-sensitized solar cells", Energy and Environmental Science, vol. 1, pp. 66-78, (2008).
O'Regan, B. et al., "A low-cost, high-efficiency solar-cell based on dye-sensitized colloidal $TiO_2$ films", Nature, vol. 353, pp. 737-740, (1991).
Peter, L., ""Sticky electrons" transport and interfacial transfer of electrons in the dye-sensitized solar cell", Accounts of Chemical Research, vol. 42, No. 11, pp. 1839-1847, (2009).
Boschloo, G. et al., "Characteristics of the Iodide/triiodide redox mediator in dye-sensitized solar cells", Accounts of Chemical Research, vol. 42, No. 11, pp. 1819-1826, (2009).
Papageorgiou, N. et al., "On the relevance of mass transport in thin layer nanocrystalline photoelectrochemical solar cells", Solar Energy Materials and Solar Cells, vol. 44, pp. 405-438, (1996).
Papageorgiou, N. et al., "Morphology and adsorbate dependence of ionic transport in dye sensitized mesoporous $TiO_2$ films", Journal of Physical Chemistry B, vol. 102, pp. 4156-4164, (1998).
Junghanel, M. et al., "Role of nanochemical environments in porous $TiO_2$ in photocurrent efficiency and degradation in dye sensitized solar cells", Journal of Physical Chemistry B, vol. 109, pp. 22876-22883, (2005).
Hagfeldt, A. et al., "Dye-Sensitized Solar Cells", Chemical Review, vol. 110, pp. 6595-6663, (2010).
Peter, L.M., "Characterization and modeling of dye-sensitized solar cells", Journal of Physical Chemistry C, vol. 111, pp. 6601-6612, (2007).
Frank, A.J. et al., "Electrons in nanostructured $TiO_2$ solar cells: transport, recombination and photovoltaic properties", Coordination Chemistry Reviews, vol. 248, pp. 1165-1179, (2004).
Kopidakis, N. et al., "Ambipolar diffusion of photocarriers in electrolyte-filled, nanoporous $TiO_2$", Journal of Physical Chemistry B, vol. 104, pp. 3930-3936, (2000).
Kron, G. et al., "Electronic transport in dye-sensitized nanoporous $TiO_2$ solar cells—comparison of electrolyte and solid-state devices", Journal of Physical Chemistry B, vol. 107, pp. 3556-3564, (2003).
Shockley, W. et al., "Detailed balance limit of efficiency of p-n junction solar cells", Journal of Applied Physics, vol. 32, No. 3, pp. 510-519, (1961).
Tisdale, W.A. et al., "Hot-electron transfer from semiconductor nanocrystals", Science, vol. 328, pp. 1543-1547, (2010).
Ross, R.T. et al., "Efficiency of hot-carrier solar energy converters", Journal of Applied Physics, vol. 53, No. 5, 3813-3818, (1982).
Nazeeruddin, M.K. et al., "Combined experimental and DFT-TDDFT computational study of photoelectrochemical cell ruthenium sensitizers", Journal of the American Chemical Society, vol. 127, pp. 16835-16847, (2005).
Schlichthorl, G. et al., "Evaluation of the charge-collection efficiency of dye-sensitized nanocrystalline $TiO_2$ solar cells", Journal of Physical Chemistry B, vol. 103, pp. 782-791, (1999).
Zhu, K. et al., "Enhanced charge-collection efficiencies and light scattering in dye-sensitized solar cells using oriented $TiO_2$ nanotubes arrays", Nano Letters, vol. 7, No. 1, pp. 69-74, (2007).
Redmond, G. et al., "Effect of surface chelation on the energy of an intraband surface state of a nanocrystalline $TiO_2$ film", Journal of Physical Chemistry, vol. 97, pp. 6951-6954, (1993).
Boschloo, G. et al., "Spectroelectrochemical investigation of surface states in nanostructured $TiO_2$ electrodes", Journal of Physical Chemistry, vol. 103, pp. 2228-2231, (1999).
Boschloo, G.K. et al., "Electron trapping in porphyrin-sensitized porous nanocrystalline $TiO_2$ electrodes" Journal of Physical Chemistry, vol. 100, pp. 19489-19494, (1996).
Wang, H. et al., "Electrochemical investigation of traps in a nanostructured $TiO_2$ film", Journal of Physical Chemistry, vol. 105, pp. 2529-2533, (2001).
Chiba, Y. et al., "Dye-sensitized solar cells with conversion efficiency of 11.1%", Japanese Journal of Applied Physics, vol. 45, No. 25, pp. L638-L640, (2006).
Gratzel, M., "Solar energy conversion by dye-sensitized photovoltaic cells", Inorganic Chemistry, vol. 44, pp. 6841-6851, (2005).
Bisquert, J. et al., "The trap-limited diffusivity of electrons in nanoporous semiconductor networks permeated with a conductive phase", Applied Physics A: Materials Science & Processing, vol. 77, pp. 507-514, (2003).

(56) References Cited

OTHER PUBLICATIONS

Hengerer, R. et al., "Orientation dependence of charge-transfer processes on $TiO_2$ (Anatase) single crystals", Journal of The Electrochemical Society, vol. 147, No. 4, pp. 1467-1472, (2000).
Grimes, C.A., "Synthesis and application of highly ordered arrays of $TiO_2$ nanotubes", Journal of Materials Chemistry, vol. 17, pp. 1451-1457, (2007).
Mor, G.K. et al., "Use of highly-ordered $TiO_2$ nanotube arrays in dye-sensitized solar cells", Nano Letters, vol. 6, No. 2, pp. 215-218, (2006).
Feng, X. et al., "Vertically aligned single crystal $TiO_2$ nanowire arrays grown directly on transparent conducting oxide coated glass: synthesis details and applications", Nano Letters, vol. 8, No. 11, pp. 3781-3786, (2008).
Law, M. et al., "Nanowire dye-sensitized solar cells", Nature Materials, vol. 4, pp. 455-459, (2005).
Martinson, A.B.F. et al., "ZnO nanotube based dye-sensitized solar cells", Nano Letters, vol. 7, No. 8, pp. 2183-2187, (2007).
Martinson, A.B.F. et al., "Radial electron collection in dye-sensitized solar cells", Nano Letters, vol. 8, No. 9, pp. 2862-2866, (2008).
Mora-Sero, I. et al., "Determination of carrier density of ZnO nanowires by electrochemical techniques", Applied Physics Letters, vol. 89, pp. 203117-1-203117-3, (2006).
Shankar, K. et al., "Highly efficient solar cells using $TiO_2$ nanotube arrays sensitized with a donor-antenna dye", Nano Letters, vol. 8, No. 6, pp. 1654-1659, (2008).
Kim, D. et al., "Bamboo-type $TiO_2$ nanotubes: Improved conversion efficiency in dye-sensitized solar cells", Journal of the American Chemical Society, vol. 130, pp. 16454-16455, (2008).
Paulose, M. et al., "Application of highly-ordered $TiO_2$ nanotube-arrays in heterojunction dye-sensitized solar cells", Journal of Physics D: Applied Physics, vol. 39, pp. 2498-2503, (2006).
Liu, B. et al., "Growth of oriented single-crystalline rutile $TiO_2$ nanorods on transparent conducting substrates for dye-sensitized solar cells", Journal of the American Chemical Society, vol. 131, pp. 3985-3990, (2009).
Shankar, K. et al., "Recent advances in the use of $TiO_2$ nanotube and nanowire arrays for oxidative photoelectrochemistry", Journal of Physical Chemistry C, vol. 113, pp. 6327-6359, (2009).
Martinson, A.B.F. et al., "Electron transport in dye-sensitized solar cells based on ZnO nanotubes: Evidence for highly efficient charge collection and exceptionally rapid dynamics", Journal of Physical Chemistry A, vol. 113, pp. 4015-4021, (2009).
Jennings, J.R. et al., "Dye-sensitized solar cells based on oriented $TiO_2$ nanotube arrays: transport, trapping, and transfer of electrons", Journal of the American Chemical Society, vol. 130, pp. 13364-13372, (2008).
Martinson, A.B.F. et al., "Dynamics of charge transport and recombination in ZnO nanorod array dye-sensitized solar cells", Physical Chemistry Chemical Physics, vol. 8, pp. 4655-4659, (2006).
Martinson, A.B.F. et al., "New architectures for dye-sensitized solar cells", Chemistry: A European Journal, vol. 14, pp. 4458-4467, (2008).
Asano, T. et al., "Short-circuit current density behavior of dye-sensitized solar cells", Japanese Journal of Applied Physics, vol. 44, No. 9A, pp. 6776-6780, (2005).
Chen, H.H. et al., "Dye-sensitized solar cells using ZnO nanotips and Ga-doped ZnO films", Semiconductor Science and Technology, vol. 23, pp. 045004-1-045004-6, (2008).
Clifford, J.N. et al., "Dye dependent regeneration dynamics in dye sensitized nanocrystalline solar cells: Evidence for the formation of a ruthenium bipyridyl cation/iodide intermediate", Journal of Physical Chemistry, vol. 111, pp. 6561-6567, (2007).
Gregg, B.A. et al., "Interfacial recombination processes in dye-sensitized solar cells and methods to passivate the interfaces", Journal of Physical Chemistry B, vol. 105, pp. 1422-1429, (2001).
Ito, S. et al., "Bifacial dye-sensitized solar cells based on an ionic liquid electrolyte", Nature Photonics, vol. 2, pp. 693-698, (2008).

Kang, M.G. et al., "Dependence of $TiO_2$ film thickness on photocurrent-voltage characteristics of dye-sensitized solar cells", Bull. Korean Chemical Society, vol. 25, No. 5, pp. 742-744, (2004).
O'Regan, B.C. et al., "Catalysis of recombination and its limitation on open circuit voltage for dye sensitized photovoltaic cells using phthalocyanine dyes", Journal of the American Chemical Society, vol. 130, pp. 2906-2907, (2008).
Splan, K.E. et al., "A porous multilayer dye-based photoelectrochemical cell that unexpectedly runs in reverse", Journal of Physical Chemistry B, vol. 108, pp. 4111-4115, (2004).
Paulose, M. et al., "$TiO_2$ nanotube arrays of 1000 µm length by anodization of titanium foil: Phenol red diffusion", Journal of Physical Chemistry C, vol. 111, pp. 14992-14997, (2007).
Hoffmann, M.R. et al., "Environmental applications of semiconductor photocatalysis", Chemical Review, vol. 95, pp. 69-96, (1995).
Linsebigler, A.L. et al., "Photocatalysis on $TiO_2$ surfaces: Principles, mechanisms, and selected results", Chemical Review, vol. 95, pp. 735-758, (1995).
Thompson, T.L. et al., "Surface science studies of the photoactivation of $TiO_2$—new photochemical processes", Chemical Review, vol. 106, pp. 4428-4453, (2006).
Alvaro, M. et al., "Photocatalytic activity of structured mesoporous $TiO_2$ materials", Journal of Physical Chemistry B, vol. 110, pp. 6661-6665, (2006).
He, D.P. et al., "Preparation and photocatalytic activity of anatase $TiO_2$ nanocrystallites with high thermal stability", Materials Letters, vol. 61, pp. 3385-3387, (2007).
Finazzi, E. et al., "Boron-doped anatase $TiO_2$: Pure and hybrid DFT calculations", Journal of Physical Chemistry C, vol. 113, pp. 220-228, (2009).
Gopal, N.O. et al., "Chemical state and environment of boron dopant in B,N-codoped anatase $TiO_2$ nanoparticles: An avenue for probing diamagnetic dopants in $TiO_2$ by electron paramagnetic resonance spectroscopy", Journal of the American Chemical Society, vol. 130, pp. 2760-2761, (2008).
Periyat, P. et al., "Improved high-temperature stability and sun-light-driven photocatalytic activity of sulfur-doped anatase $TiO_2$,", Journal of Physical Chemistry C, vol. 112, pp. 7644-7652, (2008).
Periyat, P. et al., "One-pot synthesis of anionic (nitrogen) and cationic (sulfur) codoped high-temperature stable, visible light active, anatase photocatalysts", Journal of Physical Chemistry C, vol. 113, pp. 3246-3253, (2009).
Asahi, R. et al., "Visible-light photocatalysis in nitrogen-doped titanium oxides", Science, vol. 293, pp. 269-271, (2001).
Zuo, F. et al., "Self-doped $Ti^{3+}$ enhanced photocatalyst for hydrogen production under visible light", Journal of the American Chemical Society, vol. 132, pp. 11856-11857, (2010).
Chen, X. et al., "Increasing solar absorption for photocatalysis with black hydrogenated titanium dioxide nanocrystals", Science, vol. 331, pp. 746-750, (2011).
Justicia, I. et al., "Designed self-doped titanium oxide thin films for efficient visible light photocatalysis", Advanced Materials, vol. 14, No. 19, pp. 1399-1402, (2002).
Nowotny, J. et al., "$TiO_2$ surface active sites for water splitting", Journal of Physical Chemistry B, vol. 110, pp. 18492, 18495, (2006).
Cronemeyer, D.C., "Infrared absorption of reduced rutile $TiO_2$ single crystals", Physical Review, vol. 113, No. 5, pp. 1222-1226, (1959).
Teleki, A. et al., "Blue nano titania made in diffusion flames", Physical Chemistry Chemical Physics, vol. 11, pp. 3742-3747, (2009).
Komaguchi, K. et al., "Electron-transfer reaction of oxygen species on $TiO_2$ nanoparticles induced by sub-band-gap illumination", Journal of Physical Chemistry C, vol. 114, pp. 1240-1245, (2010).
Xu, T. et al., "Rectification by a monolayer of hexadecylquinolinium tricyanoquinodimethanide between gold electrodes", Angewandte Chemie International Edition, vol. 40, No. 9, pp. 1749-1752, (2001).
Metzger, R.M. et al., "Electrical rectification by a monolayer of hexadecylquinolinium tricyanoquinodimethanide measured between macroscopic gold electrodes", Journal of Physical Chemistry B, vol. 105, pp. 7280-7290, (2001).

(56) References Cited

OTHER PUBLICATIONS

Xu, T. et al., "A spectroscopic study of hexadecylquinolinium tricyanoquinodimethanide as a monolayer and in bulk", Journal of Physical Chemistry B, vol. 106, pp. 10374-10381, (2002).
Xu, T. et al., "Current-voltage characteristics of an LB monolayer of didecylammonium tricyanoquinodimethanide measured between macroscopic gold electrodes", Journal of Materials Chemistry, vol. 12, pp. 3167-3171, (2002).
Gao, Y. et al., "Electron transfer of carotenoids imbedded in MCM-41 and Ti-MCM-41: EPR, ENDOR and UV-Vis studies", Journal of Physical Chemistry B, vol. 106, pp. 10808-10815, (2002).
Patel, U. et al., "Origin of the matching effect in a superconducting film with a hole array", Physical Review B, vol. 76, pp. 020508-1-020508-4, (2007).
Xu, T. et al., "Self-assembled monolayer-enhanced hydrogen sensing with ultra-thin palladium films", Applied Physics Letters, vol. 86, pp. 203104-1-203104-3, (2005).
Xu, T. et al., "Periodic holes with 10 nm diameter produced by grazing Ar+ milling of the barrier layer in hexagonally ordered nanoporous alumina" Nano Letters, vol. 2, No. 1, pp. 37-41, (2002).
Xu, T. et al., "Nanoditches fabricated using a carbon nanotube as a contact mask", Nano Letters, vol. 2, No. 10, pp. 1061-1065, (2002).
Lin, C. et al., "Hydrogen spillover enhanced hydriding kinetics of palladium-doped lithium nitride to lithium imide", Journal of Physical Chemistry C, vol. 113, No. 19, pp. 8513-8517, (2009).
Xu, T. et al., "Synthesis of supported platinum nanoparticles from Li-Pt solid solution", Journal of the American Chemical Society, vol. 132, pp. 2151-2153, (2010).
Kulchytskyy, I. et al., "Direct mass determination of hydrogen uptake using a quartz crystal microbalance", Applied Physics Letters, vol. 91, pp. 113507-1-113507-3, (2007).
Chakrabarti, A. et al., "Synthesis of boron nanorods by smelting non-toxic boron oxide in liquid lithium", Journal of Nanomaterials, vol. 2010, article ID 589372, pp. 1-5, (2010).
Xu, P. et al., "$I_2$-hydrosol-seeded growth of $(I_2)_n$-C-codoped meso/nanoporous $TiO_2$ for visible light-driven photocatalysis", Journal of Physical Chemistry C, vol. 114, pp. 9510-9517, (2010).
Xu, P. et al., "Visible-light-driven photocatalytic S- and C- codoped meso/nanoporous $TiO_2$" Energy & Environmental Science, vol. 3, pp. 1128-1134, (2010).
O'Regan, B.C. et al., "Measuring charge transport from transient photovoltage rise times. A new tool to investigate electron transport in nanoparticle films", Journal of Physical Chemistry B, vol. 110, pp. 17155-17160, (2006).
Adachi, M. et al., "Determination of parameters of electron transport in dye-sensitized solar cells using electrochemical impedance spectroscopy", Journal of Physical Chemistry B, vol. 110, pp. 13872-13880, (2006).
van de Lagemaat, J. et al., "Influence of electrical potential distribution, charge transport, and recombination on the photopotential and photocurrent conversion efficiency of dye-sensitized nanocrystalline $TiO_2$ solar cells: A study by electrical impedance and optical modulation techniques", Journal of Physical Chemistry B, vol. 104, pp. 2044-2052, (2000).
Bisquert, J., "Theory of the impedance of electron diffusion and recombination in a thin layer", Journal of Physical Chemistry B, vol. 106, pp. 325-333, (2002).
Schwarzburg, K. et al., "Origin of photovoltage and photocurrent in the nanoporous dye-sensitized electrochemical solar cell", Journal of Physical Chemistry B, vol. 103, pp. 5743-5746, (1999).
Bisquert, J. et al., "Modelling the electric potential distribution in the dark in nanoporous semiconductor electrodes", Journal of Solid State Electrochemistry, vol. 3, pp. 337-347, (1999).
Jiang, C.Y. et al., "Improved dye-sensitized solar cells with a ZnO-nanoflower photoanode", Applied Physics Letters, vol. 90, pp. 263501-1-263501-3, (2007).

Cheng, H-M. et al., "Formation of branched ZnO nanowires from solvothermal method and dye-sensitized solar cells applications", Journal of Physical Chemistry C, vol. 112, pp. 16359-16364, (2008).
Xia, J. et al., "Deposition of a thin film of $TiO_x$ from a titanium metal target as novel blocking layers at conducting glass/$TiO_2$ interfaces in ionic liquid mesoscopic $TiO_2$ dye-sensitized solar cells", Journal of Physical Chemistry B, vol. 110, pp. 25222-25228, (2006).
Hamal, D.B. et al., "Synthesis, characterization, and visible light activity of new nanoparticle photocatalysts based on silver, carbon, and sulfur-doped $TiO_2$", Journal of Colloid and Interface Science, vol. 311, pp. 514-522, (2007).
Hahn, R. et al., "Semimetallic $TiO_2$ Nanotubes", Angewandte Chemmie International Edition, vol. 48, pp. 7236-7239, (2009).
Kavan, L. et al., "Electrochemical and photoelectrochemical investigation of single-crystal anatase", Journal of the American Chemical Society, vol. 118, pp. 6716-6723, (1996).
Forro, L. et al., "High mobility n-type charge carriers in large single crystals of anatase ($TiO_2$)", Journal of Applied Physics, vol. 75, No. 1, pp. 633-635, (1994).
Wagner, P. et al., "Hall effect and anisotropy of the mobility of the electrons in zinc oxide", Journal of Physics and Chemistry of Solids, vol. 35, pp. 327-335, (1974).
Wang, A. et al., "Indium—cadmium—oxide films having exceptional electrical conductivity and optical transparency: Clues for optimizing transparent conductors", Proceedings of the National Academy of Science, vol. 98, pp. 7113-7116, (2001).
Green, A.N.M. et al., "Charge transport versus recombination in dye-sensitized solar cells employing nanocrystalline $TiO_2$ and $SnO_2$ films", Journal of Physical Chemistry B, vol. 109, pp. 12525-12533, (2005).
Peter, L.M. et al., "Dye-sensitized nanocrystalline solar cells", Physical Chemistry Chemical Physics, vol. 9, pp. 2630-2642, (2007).
Snaith, H.J. et al., "Light intensity, temperature, and thickness dependence of the open-circuit voltage in solid-state dye-sensitized solar cells", Physical Review B, vol. 74, pp. 045306-1-045306-6, (2006).
Ito, S. et al., "High-efficiency (7.2%) flexible dye-sensitized solar cells with Ti-metal substrate for nanocrystalline-$TiO_2$ photoanode", Chemical Communications, pp. 4004-4006, (2006).
Chen, H-Y. et al., "Polymer solar cells with enhanced open-circuit voltage and efficiency", Nature Photonics, vol. 3, pp. 649-653, (2009).
Calnan, S. et al., "High mobility transparent conducting oxides for thin film solar cells", Thin Solid Films, vol. 518, pp. 1839-1849, (2010).
Aduda, B.O. et al., "Effect of morphology on electron drift mobility in porous $TiO_2$", International Journal of Photoenergy, vol. 6, pp. 141-147, (2004).
Richter, C. et al., "Exciton-like trap states limit electron mobility in $TiO_2$ nanotubes", Nature Nanotechnology, vol. 5, pp. 769-772, (2010).
Ruhle, S. et al., "Investigation of the electric field in $TiO_2$/FTO junctions used in dye-sensitized solar cells by photocurrent transients", Journal of Physical Chemistry B, vol. 109, pp. 9522-9526, (2005).
Zhong, Y.L. et al., "Diamond-based molecular platform for photoelectrochemistry", Journal of the American Chemical Society, vol. 130, pp. 17218-17219, (2008).
Benda, V. et al., "Power semiconductor devices: Theory and Applications", John Wiley & Sons Ltd., Chapter 2, section 2.4, pp. 62-65, (1999).
Helander, M.G. et al., "Band alignment at metal/organic and metal/oxide/organic interfaces", Applied Physics Letters, vol. 93, pp. 193310-1-193310-3, (2008).
George, S.M., "Atomic layer deposition: An overview", Chemical Review, vol. 110, pp. 111-131, (2010).
Breen, T.L. et al., "Patterning indium tin oxide and indium zinc oxide using microcontact printing and wet etching", Langmuir, vol. 18, pp. 194-197, (2002).

(56) References Cited

OTHER PUBLICATIONS

Emons, T.T. et al., "Synthesis and characterization of mesoporous indium tin oxide possessing an electronically conductive framework", Journal of the American Chemical Society, vol. 124, pp. 8516-8517, (2002).
Mahajeri, M. et al., "Evaluation of the film formation and the charge transport mechanism of indium tin oxide nanoparticle films", Thin Solid Films, vol. 518, pp. 3373-3381, (2010).
Lee, I. et al., "Growth of conductive indium tin oxide (ITO) nanoparticles by mineralization in ring-shaped biomimetic templates", Journal of Physical Chemistry C, vol. 113, pp. 17372-17377, (2009).
Purwanto, A. et al., "Facile method for the fabrication of vertically aligned ITO nanopillars with excellent properties", Chemistry of Materials Communicationm, vol. 21, pp. 4087-4089, (2009).
Choi, S-I. et al., "Preparation and optical properties of colloidal, monodisperse, and highly crystalline ITO nanoparticles", Chemistry of Materials, vol. 20, pp. 2609-2611, (2008).
Aouaj, M.A. et al., "Comparative study of ITO and FTO thin films grown by spray pyrolysis", Materials Research Bulletin, vol. 44, pp. 1458-1461, (2009).
Epifani, M. et al., "Solution synthesis of thin films in the $SnO_2$-$In_2O_3$ system: A case study of the mixing of sol-gel and metal-organic solution processes", Chemistry of Materials, vol. 18, pp. 840-846, (2006).
Cho, Y-S. et al., "Colloidal indium tin oxide nanoparticles for transparent and conductive films", Thin Solid Films, vol. 515, pp. 1864-1871, (2006).
Hwang, I. et al., "Drift-diffusion modeling of photocurrent transients in bulk heterojunction solar cells", Journal of Applied Physics, vol. 106, pp. 094506-1-094506-10, (2009).
Chen, P. et al., "High open-circuit voltage solid-state dye-sensitized solar cells with organic dye", Nano Letters, vol. 9, No. 6, pp. 2487-2492, (2009).
Pandey, S.S. et al., "Influence of nature of surface dipoles on observed photovoltage in dye-sensitized solar cells as probed by surface potential measurement", Organic Electronics, vol. 11, pp. 419-426, (2010).
Hamann, T.W. et al., "Outer-sphere redox couples as shuttles in dye-sensitized solar cells. Performance enhancement based on photoelectrode modification via atomic layer deposition" Journal of Physical Chemistry C, vol. 112, pp. 19756-19764, (2008).
Kuciauskas, D. et al., "Electron transfer dynamics in nanocrystalline titanium dioxide solar cells sensitized with ruthenium or osmium polypyridyl complexes", Journal of Physical Chemistry B, vol. 105, pp. 392-403, (2001).
Fabregat-Santiago, F. et al., "Electron transport and recombination in solid-state dye solar cell with spiro-OMeTAD as hole conductor", Journal of the American Chemical Society, vol. 131, pp. 558-562, (2009).
Ding, I-K. et al., "Pore-filling of spiro-OMeTAD in solid-state dye sensitized solar cells: Quantification, mechanism, and consequences for device performance", Advanced Functional Materials, vol. 19, pp. 2431-2436, (2009).
Li, T.C. et al., "Ni(III)/(IV) Bis(dicarbollide) as a fast, noncorrosive redox shuttle for dye-sensitized solar cells", Journal of the American Chemical Society, vol. 132, pp. 4580-4582, (2010).
Wang, M. et al., "An organic redox electrolyte to rival triiodide/iodide in dye-sensitized solar cells", Nature Chemistry, vol. 2, pp. 385-389, (2010).
Usami, A. et al., "Theoretical study of application of multiple scattering of light to a dye-sensitized nanocrystalline photoelectrochemical cell", Chemical Physics Letters, vol. 277, pp. 105-108, (1997).
Nishimura, S. et al., "Standing wave enhancement of red absorbance and photocurrent in dye-sensitized titanium dioxide photoelectrodes coupled to photonic crystals", Journal of the American Chemical Society, vol. 125, pp. 6306-6310, (2003).
Mihi, A. et al., "Origin of light-harvesting enhancement in colloidal-photonic-crystal-based dye-sensitized solar cells", Journal of Physical Chemistry B, vol. 109, pp. 15968-15976, (2005).
Mihi, A. et al., "Full spectrum enhancement of the light harvesting efficiency of dye sensitized solar cells by including colloidal photonic crystal multilayers", Applied Physics Letters, vol. 88, pp. 193110-1-193110-3, (2006).
Mihi, A. et al., "Spectral response of opal-based dye-sensitized solar cells", Journal of Physical Chemistry C, vol. 112, pp. 13-17, (2008).
Waterhouse, G.I.N. et al., "Physical and optical properties of inverse opal $CeO_2$ photonic crystals", Chemistry of Materials, vol. 20, pp. 1183-1190, (2008).
Turner, M.E. et al., "Thin films of macroporous metal oxides", Advanced Materials, vol. 13, pp. 180-183, (2001).
Jiang, P. et al., "A lost-wax approach to monodisperse colloids and their crystals", Science, vol. 291, pp. 453-457, (2001).
Jiang, P. et al., "The fabrication and bandgap engineering of photonic multilayers", Advanced Materials, vol. 13, pp. 389-393, (2001).
Rengurajan, R. et al., "Colloidal photonic superlattices", Physical Review B, vol. 64, pp. 205103-1-205103-4, (2001).
Holland, B.T. et al., "Synthesis of macroporous minerals with highly ordered three-dimensional arrays of spheroidal voids", Science, vol. 281, pp. 538-540, (1998).
Yan, H. et al., "General synthesis of periodic macroporous solids by templated salt precipitation and chemical conversion", Chemistry of Materials, vol. 12, pp. 1134-1141, (2000).
Schroden, R.C. et al., "Self-modification of spontaneous emission by inverse opal silica photonic crystals", Chemistry of Materials, vol. 13, pp. 2945-2950, (2001).
Yablonovitch, E., "Inhibited spontaneous emission in solid-state physics and electronics", Physical Review Letters, vol. 58, No. 20, pp. 2059-2062, (1987).
John, S., "Strong localization of photons in certain disordered dielectric superlattices", Physical Review Letters, vol. 58, pp. 2486-2489, (1987).
Han, C-H. et al., "Synthesis of indium tin oxide (ITO) and fluorine-doped tin oxide (FTO) nano-powder by sol-gel combustion hybrid method", Materials Letters, vol. 61, pp. 1701-1703, (2007).
Ito, S. et al., "Control of dark current in photoelectrochemical ($TiO_2/I_3^-$) and dye-sensitized solar cells", Chemical Communications, pp. 4351-4353, (2005).
Hatton, B. et al., "Assembly of large-area, highly ordered, crack-free inverse opal films", Proceeding of the National Academy of Science, vol. 107, pp. 10354-10359, (2010).
Tao, C. et al., "Theoretical demonstration of efficiency enhancement of dye-sensitized solar cells with double-inverse opal as mirrors", Journal of Physical Chemistry C, vol. 114, pp. 10641-10647, (2010).
Izumi, Y. et al., "Improving the light out-coupling properties of inorganic thin-film electroluminescent devices", Japanese Journal of Applied Physics, vol. 41, part 1, No. 3A, pp. 1284-1287, (2002).
Christ, A. et al., "Waveguide-plasmon polaritons: Strong coupling of photonic and electronic resonances in a metallic photonic crystal slab", Physical Review Letters, vol. 91, No. 18, pp. 183901-1-183901-4, (2003).
Lee, J. et al., "Electrostatic capacitance of $TiO_2$ nanowires in a porous alumina template", Nanotechnology, vol. 16, pp. 1449-1453, (2005).
Park, Y.R. et al., "Structural and optical properties of rutile and anatase $TiO_2$ thin films: Effects of Co doping", Thin Solid Films, vol. 484, pp. 34-38, (2005).
Stamate, M. et al., "Anatase—rutil $TiO_2$ thin films deposited in a D.C. magnetron sputtering system", Romanian Journal of Physics, vol. 53, No. 1-2, pp. 217-221, (2008).
Tennakone, K. et al., "The possibility of ballistic electron transport in dye-sensitized semiconductor nanocrystalline particle aggregates", Semiconductor Science and Technology, vol. 14, pp. 975-978, (1999).
Niinobe, D. et al., "Origin of enhancement in open-circuit voltage by adding ZnO to nanocrystalline $SnO_2$ in dye-sensitized solar cells", Journal of Physical Chemistry B, vol. 109, pp. 17892-17900, (2005).

(56) References Cited

OTHER PUBLICATIONS

Kay, A. et al., "Dye-sensitized core-shell nanocrystals: Improved efficiency of mesoporous tin oxide electrodes coated with a thin layer of an insulating oxide", Chemistry of Materials, vol. 14, pp. 2930-2935, (2002).
Benko, G. et al., "Interligand electron transfer determines triplet excited state electron injection in RuN3-sensitized $TiO_2$ films", Journal of Physical Chemistry B, vol. 108, pp. 2862-2867, (2004).
Kallioinen, J. et al., "Electron transfer from the singlet and triplet excited states of $Ru(dcbpy)_2(NCS)_2$ into nanocrystalline $TiO_2$ thin films", Journal of Physical Chemistry B, vol. 106, pp. 4396-4404, (2002).
Asbury, J.B. et al., "Femtosecond IR study of excited-state relaxation and electron-injection dynamics of $Ru(dcbpy)_2(NCS)_2$ in solution and on nanocrystalline $TiO_2$ and $Al_2O_3$ thin films", Journal of Physical Chemistry B, vol. 103, pp. 3110-3119, (1999).
Datta, S. "Electronic Transport in Mesoscopic Systems" Cambridge Studies in Semiconductor Physics and Microelectronic Engineering, Cambridge University Press: New York, Chapter 2, pp. 57-111, (1997).
Anderson, K. et al., "Reactivity of titanium hydride with air", Industrial and Engineering Chemistry, vol. 42, No. 7, pp. 1381-1383, (1950).
Kathawalla, I.A. et al., "Pore size effects on diffusion of polystyrene in dilute solution", Industrial and Engineering Chemistry Research, vol. 27, pp. 866-871, (1988).
Hartmann, P. et al., "Mesoporous $TiO_2$: Comparison of classical sol-gel and nanoparticle based photoelectrodes for the water splitting reaction", ACS Nano, vol. 4, No. 6, pp. 3147-3154, (2010).
Liu, X. et al., "Highly crystalline spindle-shaped mesoporous anatase titania particles: Solution-phase synthesis, characterization, and photocatalytic properties", Langmuir, vol. 26, pp. 7671-7674, (2010).
Atwater, H.A. et al., "Plasmonics for improved photovoltaic devices", Nature Materials, vol. 9, pp. 205-213, (2010).
Prodan, E. et al., "A hybridization model for the plasmon response of complex nanostructures", Science, vol. 302, pp. 419-422, (2003).
Ferry, V.E. et al., "Design considerations for plasmonic photovoltaics", Advanced Materials, vol. 22, pp. 4794-4808, (2010).
Testino, A. et al., "Optimizing the photocatalytic properties of hydrothermal $TiO_2$ by the control of phase composition and particle morphology. A systematic approach", Journal of the American Chemical Society, vol. 129, pp. 3564-3575, (2007).
Usseglio, S. et al., "$(I_2)n$ Encapsulation inside $TiO_2$: A way to tune photoactivity in the visible region", Journal of the American Chemical Society, vol. 129, pp. 2822-2828, (2007).
Gur, I. et al., "Air-stable all-inorganic nanocrystal solar cells processed from solution", Science, vol. 310, pp. 462-465, (2005).
Kongkanand, A. et al., "Quantum dot solar cells. Tuning photoresponse through size and shape control of CdSe-TiO architecture", Journal of the American Chemical Society, vol. 130, pp. 4007-4015, (2008).
Huynh, W.U. et al., "Hybrid nanorod-polymer solar cells", Science, vol. 295, pp. 2425-2427, (2002).
Hains, A.W. et al., "Molecular semiconductors in organic photovoltaic cells", Chemical Review, vol. 110, pp. 6689-6735, (2010).
Zhu, X-Y. et al., "Charge-transfer excitons at organic semiconductor surfaces and interfaces", Accounts of Chemical Research, vol. 42, pp. 1779-1787, (2009).
Bredas, J.L. et al., "Molecular understanding of organic solar cells: The challenges", Accounts of Chemical Research, vol. 42, pp. 1691-1699, (2009).
Gunes, S. et al., "Conjugated polymer-based organic solar cells", Chemical Reviews, vol. 107, pp. 1324-1338, (2007).
Fischer, S. et al., "Enhancement of silicon solar cell efficiency by upconversion: Optical and electrical characterization", Journal of Applied Physics, vol. 108, pp. 044912-1-044912-11, (2010).
Sokolnicki, J. et al., "Investigation of Er, Er:Yb and Er:Tm systems in silica sol-gels", Journal of Alloys and Compounds, vol. 300-301, pp. 450-455, (2000).
Delevaque, E. et al., "Modeling of pair-induced quenching in erbium-doped silicate fibers", IEEE Photonics Technology Letters, vol. 5, pp. 73-75, (1993).
Boivin, D. et al., "Quenching investigation on new erbium doped fibers using MCVD nanoparticle doping process", Proceedings of SPIE, vol. 7580, pp. 75802B-1-75802B-9, (2010).
Solomon, S.D. et al., "Synthesis and study of silver nanoparticles", Journal of Chemical Education, vol. 84, No. 2, pp. 322-325, (2007).
Smestad, G.P. et al., "Demonstrating electron transfer and nanotechnology: A natural dye-sensitized nanocrystalline energy converter", Journal of Chemical Education, vol. 75, pp. 752-756, (1998).
Zeng, X.Q. et al., "Hydrogen gas sensing with networks of ultrasmall palladium nanowires formed on filtration membranes", Nano Letters, vol. 11, pp. 262-268, (2011).
Cameron, P.J. et al., "How does back-reaction at the conducting glass substrate influence the dynamic photovoltage response of nanocrystalline dye-sensitized solar cells?", Journal of Physical Chemistry B, vol. 109, pp. 7392-7398, (2005).
O'Regan, B.C. et al., "Influence of the $TiCl_4$ treatment on nanocrystalline $TiO_2$ films in dye-sensitized solar cells. 2. Charge density, band edge shifts, and quantification of recombination losses at short circuit", Journal of Physical Chemistry C, vol. 111, pp. 14001-14010, (2007).
Yu, H. et al., "High-performance $TiO_2$ photoanode with an efficient electron transport network for dye-sensitized solar cells", Journal of Physical Chemistry C, vol. 113, pp. 16277-16282, (2009).
Kang, S.H. et al., "Nanorod-based dye-sensitized solar cells with improved charge collection efficiency", Advanced Materials, vol. 20, pp. 54-58, (2008).
Kuang, D. et al., "Application of highly ordered $TiO_2$ nanotube arrays in flexible dye-sensitized solar cells", ACS Nano, vol. 2, No. 6, pp. 1113-1116, (2008).
Wang, Y, et al., "Ordered mesoporous Sb-, Nb-, and Ta- doped $SnO_2$ thin films with adjustable doping levels and high electrical conductivity", ACS Nano, vol. 3, No. 6, pp. 1373-1378, (2009).
Wu, H. et al., "Low reflectivity and high flexibility of tin-doped indium oxide nanofiber transparent electrodes", Journal of the American Chemical Society, vol. 133, pp. 27-29, (2011).
Fessenden, R.W. et al., "Rate constants for charge injection from excited sensitizer into $SnO_2$, ZnO, and $TiO_2$ semiconductor nanocrystallites", Journal of Physical Chemistry, vol. 99, pp. 12902-12906, (1995).
Guldin, S. et al., "Dye-sensitized solar cell based on a three-dimensional photonic crystal" Nano Letters, vol. 10, pp. 2303-2309, (2010).
Jacobsen V. et al., "Electronic properties of nanoporous $TiO_2$ films investigated in real space by means of scanning tunneling spectroscopy", Applied Surface Science, vol. 252, pp. 3903-3911, (2006).
Breeze, A.J. et al., "Charge transport in $TiO_2$/MEH-PPV polymer photovoltaics", Physical Review B, vol. 64, pp. 125205-1-125205-9, (2001).
Turrion, M. et al., "Potential distribution and photovoltage origin in nanostructured $TiO_2$ sensitization solar cells: An interference reflection study", Journal of Physical Chemistry B, vol. 105, pp. 9732-9738, (2001).
Turrion, M. et al., "Flatband potential of $F:SnO_2$ in a $TiO_2$ dye-sensitized solar cell: An interference reflection study" Journal of Physical Chemistry B, vol. 107, pp. 9397-9403, (2003).
Kawashima, T. et al., "FTO/ITO double-layered transparent conductive oxide for dye-sensitized solar cells", Journal of Photochemistry and Photobiology A: Chemistry, vol. 164, pp. 199-202, (2004).
Zhi, X. et al., "The morphological, optical and electrical properties of $SnO_2$:F thin films prepared by spray pyrolysis", Surface and Interface Analysis, vol. 40, pp. 67-70, (2008).
Kumar, V. et al., "Optical and photocatalytic properties of heavily F-doped $SnO_2$ Nanocrystals by a novel single-source precursor approach" Inorganic Chemistry, vol. 50, pp. 5637-5645, (2011).
Abel, K.A. et al., "Analysis of the shell thickness distribution on $NaYF_4/NaGdF_4$ core/shell nanocrystals by EELS and EDS", The Journal of Physical Chemistry Letters, vol. 2, pp. 185-189, (2011).

(56) References Cited

OTHER PUBLICATIONS

Ramasamy, E. et al., "Ordered mesoporous $SnO_2$-based photoanodes for high-performance dye-sensitized solar cells", Journal of Physical Chemistry C, vol. 114, pp. 22032-22037, (2010).
Tiwana, P. et al., "Electron mobility and injection dynamics in mesoporous ZnO, $SnO_2$, and $TiO_2$ films used in dye-sensitized solar cells" ACS Nano, vol. 5, No. 6, pp. 5158-5166, (2011).
Chappel, S. et al., "$TiO_2$-coated nanoporous $SnO_2$ electrodes for dye-sensitized solar cells", Langmuir, vol. 18, pp. 3336-3342, (2002).
Prasittichai, C. "Surface modification of $SnO_2$ photoelectrodes in dye-sensitized solar cells: Significant improvements in photovoltage via $Al_2O_3$ atomic layer deposition" The Journal of Physical Chemistry Letters, vol. 1, pp. 1611-1615, (2010).
Klein, A. et al., "Transparent conducting oxides for photovoltaics: Manipulation of Fermi level, work function and energy band alignment", Materials, vol. 3, pp. 4892-4914, (2010).
Avadhut, Y.S. et al., "Study on the defect structure of $SnO_2$:F nanoparticles by high-resolution solid-state NMR" Chemistry of Materials, vol. 23, pp. 1526-1538, (2011).
Gubbala, S. et al., "Band-edge engineered hybrid structures for dye-sensitized solar cells based on $SnO_2$ nanowires", Advanced Functional Materials, vol. 18, pp. 2411-2418, (2008).
Snaith, H.J. et al., "$SnO_2$-based dye-sensitized hybrid solar cells exhibiting near unity absorbed photon-to-electron conversion efficiency", Nano Letters, vol. 10, pp. 1259-1265, (2010).
Sellers, M.C.K. et al., "Manipulation of polycrystalline $TiO_2$ carrier concentration via electrically active native defects", Journal of Vacuum Science and Technology A, vol. 29, No. 6, pp. 061503-1-061503-8, (2011).
Ito, S. et al., "Study of dye-sensitized solar cells by scanning electron micrograph observation and thickness optimization of porous $TiO_2$ electrodes" International Journal of Photoenergy, vol. 2009, pp. 1-8, (2009).
Ito, S. et al., "High-efficiency organic-dye-sensitized solar cells controlled by nanocrystalline-$TiO_2$ electrode thickness", Advanced Materials, vol. 18, pp. 1202-1205, (2006).
Gonzalez-Pedro, V. et al., "Modeling high-efficiency quantum dot sensitized solar cells", ACS Nano, vol. 4, No. 10, pp. 5783-5790, (2010).
Wang, Q. et al., "Characteristics of high efficiency dye-sensitized solar cells", Journal of Physical Chemistry B, vol. 110, pp. 25210-25221, (2006).
Fabregat-Santiago, F. et al., "Characterization of nanostructured hybrid and organic solar cells by impedance spectroscopy", Physical Chemistry Chemical Physics, vol. 13, pp. 9083-9118, (2011).
Agrios, A.G. et al., "Low-temperature $TiO_2$ films for dye-sensitized solar cells: Factors affecting energy conversion efficiency", Journal of Physical Chemistry C, vol. 112, pp. 10021-10026, (2008).
Spokoyny, A.M. et al., "Electronic tuning of nickel-based bis(dicarbollide) redox shuttles in dye-sensitized solar cells", Angewandte Chemie International Edition, vol. 49, pp. 5339-5343, (2010).
Wang, Q. et al., "Constructing ordered sensitized heterojunctions: Bottom-up electrochemical synthesis of p-type semiconductors in oriented n-$TiO_2$ nanotube arrays", Nano Letters, vol. 9, No. 2, pp. 806-813, (2009).
Zhang, Y. et al., "Three-dimensional nanostructures as highly efficient generators of second harmonic light", Nano Letters, vol. 11, pp. 5519-5523, (2011).
Liu, L. et al., "$TiO_2$ inverse-opal electrode fabricated by atomic layer deposition for dye-sensitized solar cell applications", Energy & Environmental Science, vol. 4, pp. 209-215, (2011).
Lee, S-H. A. et al., "Coupling of titania inverse opals to nanocrystalline titania layers in dye-sensitized solar cells", Journal of Physical Chemistry B, vol. 112, No. 46, pp. 14415-14421, (2008).
Wang, M. et al., "The influence of charge transport and recombination on the performance of dye-sensitized solar cells", Chem Phys Chem, vol. 10, pp. 290-299, (2009).
Ginley, D.S. et al., "Transparent conducting oxides", Materials Research Society Bulletin, vol. 25, issue 8, pp. 15-18, (2000).

Lewis, B.G. et al., "Applications and processing of transparent conducting oxides", Materials Research Society Bulletin, vol. 25, issue 8, pp. 22-27, (2000).
Haacke, G., "Transparent conducting coatings", Annual Review of Materials Science, vol. 7, pp. 73-93, (1977).
Granqvist, C.G., "Transparent conductors as solar energy materials: A panoramic review", Solar Energy Materials and Solar Cells, vol. 91, pp. 1529-1598, (2007).
Edwards, P.P. et al., "Basic materials physics of transparent conducting oxides", Dalton Transactions, pp. 2995-3002, (2004).
Hoel, C.A. et al., "Transparent conducting oxides in the ZnO—$In_2O_3$-$SnO_2$ system", Chemistry of Materials, vol. 22, pp. 3569-3579, (2010).
Rauf, I.A., "Low resistivity and high mobility tin-doped indium oxide films", Materials Letters, vol. 18, pp. 123-127, (1993).
Armstrong, N.R. et al., "Oxide contacts in organic photovoltaics: Characterization and control of near-surface composition in indium—tin oxide (ITO) electrodes", Accounts of Chemical Research, vol. 42, No. 11, pp. 1748-1757, (2009).
Walzer, K. et al., "Highly efficient organic devices based on electrically doped transport layers", vol. 107, pp. 1233-1271, (2007).
Ruhle, S. et al., "Electron tunneling at the $TiO_2$/substrate interface can determine dye-sensitized solar cell performance", Journal of Physical Chemistry B, vol. 108, pp. 17946-17951, (2004).
Jin, W-M. et al., "Holographically defined $TiO_2$ Electrodes for dye-sensitized solar cells", Applied Materials and Interfaces, vol. 2, No. 11, pp. 2970-2973, (2010).
Taranekar, P. et al., "Hyperbranched conjugated polyelectrolyte bilayers for solar-cell applications", Journal of the American Chemical Society, vol. 129, pp. 8958-8959, (2007).
Li, Y. et al., "Efficient fabrication and enhanced photocatalytic activities of 3D-ordered films of titania hollow spheres", Journal of Physical Chemistry B, vol. 110, pp. 13000-13004, (2006).
Xie, H. et al., "Facile fabrication of 3D-ordered macroporous nanocrystalline iron oxide films with highly efficient visible light induced photocatalytic activity", Journal of Physical Chemistry C, vol. 114, pp. 9706-9712, (2010).
Fujihara, S. et al., "Hydrothermal routes to prepare nanocrystalline mesoporous $SnO_2$ having high thermal stability", Langmuir, vol. 20, pp. 6476-6481, (2004).
Martinez, A.I. et al., "Physicochemical characteristics of fluorine doped tin oxide films", Journal of Physics D: Applied Physics, vol. 39, pp. 5091-5096, (2006).
Ramaiah, K.S. et al., Structural and electrical properties of fluorine doped tin oxide films prepared by spray-pyrolysis technique, Applied Surface Science, vol. 253, pp. 1451-1458, (2006).
Smith, A. et al., "Relation between solution chemistry and morphology of $SnO_2$-based thin films deposited by a pyrosol process", Thin Solid Films, vol. 266, pp. 20-30, (1995).
Li, H. et al., "Antireflective photoanode made of $TiO_2$ nanobelts and a ZnO nanowire array", Journal of Physical Chemistry C, vol. 114, pp. 11375-11380, (2010).
Jeong, J-A. et al., "Thickness effect of RF sputtered TiO2 passivating layer on the performance of dye-sensitized solar cells", Solar Energy Materials and Solar Cells, vol. 95, pp. 344-348, (2011).
Moyo, M. et al., "Recent advances in polymeric materials used as electron mediators and immobilizing matrices in developing enzyme electrodes", Sensors, vol. 12, pp. 923-953, (2012).
Hamberg, I. et al., "Evaporated Sn-doped $In_2O_3$ films: Basic optical properties and applications to energy-efficient windows", Journal of Applied Physics, vol. 60, issue 11, pp. R123-R159, (1986).
"Polyox Water-Soluble Resins", The Dow Chemical Company, pp. 1-23, (2002).
Takagi, D. et al., "Mechanism of gold-catalyzed carbon material growth", Nano Letters, vol. 8, No. 3, pp. 832-835, (2008).
Jiang, Q. et al., "Low voltage-driven solid electrochromic devices based on 3-D nanoporous FTO electrodes", Abstracts of Papers of the American Chemical Society, vol. 246, (2013).
Bar, G. et al., "RGB organic electrochromic cells", Solar Energy Materials & Solar Cells, vol. 99, pp. 123-128, (2012).
Scherer, M.R.J. et al., "Efficient electrochromic devices made from 3D nanotubular gyroid networks", Nano Letters, vol. 13, No. 7, pp. 3005-3010, (2013).

(56) References Cited

OTHER PUBLICATIONS

Jain, V. et al., "Millisecond switching in solid state electrochromic polymer devices fabricated from ionic self-assembled multilayers", Applied Physics Letters, vol. 92, No. 3, pp. 033304-1-033304-3, (2008).
Kim, S-H. et al., "Synthesis of a perylenediimide-viologen dyad (PDI-2V) and its electrochromism in a layer-by-layer self-assembled multilayer film with PEDOT:PSS", Journal of Materials Chemistry, vol. 22, pp. 13558-13563, (2012).
Beaujuge, P.M. et al., "Color control in π-conjugated organic polymers for use in electrochromic devices", Chemical Reviews, vol. 110, No. 1, pp. 268-320, (2010).
Gunbas, G. et al., "Electrochromic conjugated polyheterocycles and derivatives-highlights from the last decade towards realization of long lived aspirations", Chemical Communications, vol. 48, pp. 1083-1101, (2012).
Choi, S.Y., et al., "Electrochromic performance of viologen-modified periodic mesoporous nanocrystalline anatase electrodes", Nano Letters, vol. 4, No. 7, pp. 1231-1235, (2004).
Jain, V. et al., "High-contrast solid-state electrochromic devices of viologen-bridged polysilsesquioxane nanoparticles fabricated by layer-by-layer assembly", Applied Materials & Interfaces, vol. 1, No. 1, pp. 83-89, (2009).
Brewster, T.P. et al., "Hydroxamate anchors for improved photoconversion in dye-sensitized solar cells", Inorganic Chemistry, vol. 52, pp. 6752-6764, (2013).
Abraham, K.M. et al., "Highly conductive PEO-like polymer electrolytes", Chemistry of Materials, vol. 9, No. 9, pp. 1978-1988, (1997).
Li, J. et al., "Effects of vinyl ethylene carbonate additive on elevated-temperature performance of cathode material in lithium ion batteries", Journal of Physical Chemistry C, vol. 112, No. 32, pp. 12550-12556, (2008).
Byker, H.J. "Electrochromics and polymers", Electrochimica Acta, vol. 46, pp. 2015-2022, (2001).
Liu, F-Q. et al., "Three-dimensional conducting oxide nanoarchitectures: morphology-controllable synthesis, characterization, and application in lithium-ion batteries", Nanoscale, vol. 5, pp. 6422-6429, (2013).
Cho, S.I. et al., "Nanotube-based ultrafast electrochromic display", Advanced Materials, vol. 17, No. 2, pp. 171-175, (2005).
Freitag, M. et al., "Cucurbituril complexes of viologens bound to TiO$_2$ Films", Langmuir, vol. 26, No. 11, pp. 8262-8269, (2010).
Moller, M. et al., "Switchable electrochromic images based on a combined top-down bottom-up approach", Advanced Materials, vol. 16, No. 17, pp. 1558-1561, (2004).
Wu, H. et al., "Low reflectivity and high flexibility of tin-doped indium oxide nanofiber transparent eletrodes", Journal of the American Chemical Society, vol. 133, No. 1, pp. 27-29, (2011).
Li, Z. et al., "Electrochemistry of metalloporphyrins and viologens at zeolite Y modified electrodes: Evidence for electron trapping by monomolecular porphyrin layers", Journal of Physical Chemistry, vol. 92, No. 9, pp. 2592-2597, (1988).
Yang, X. et al., "A self-powered electrochromic device driven by a nanogenerator", Energy & Environmental Science, vol. 5, pp. 9462-9466, (2012).
Saito, Y. et al., "Investigation of the conduction mechanisms of lithium gel polymer electrolytes based on electrical conductivity and diffusion coefficient using NMR", Macromolecules, vol. 34, pp. 6955-6958, (2001).
Tu, X. et al. "The synthesis and electrochemical properties of cathodic-anodic composite electrochromic materials" Dyes and Pigments, vol. 88, pp. 39-43, (2011).
Hünig, S. et al., "Violene/cyanine hybrids: A general structure for electrochromic systems", Chemistry—A European Journal, vol. 5, issue 7, pp. 1969-1973, (1999).
Kurth, D.G. et al., "A new Co(II)-metalloviologen-based electrochromic material integrated in thin multilayer films", Chemical Communications, issue 16, pp. 2119-2121, (2005).

Pichot, F. et al., "A series of multicolor electrochromic ruthenium(II) trisbipyridine complexes: Synthesis and electrochemistry", Journal of Physical Chemistry A, vol. 103, No. 31, pp. 6263-6267, (1999).
Reeves, B.D. et al., "Spray coatable electrochromic dioxythiophene polymers with high coloration efficiencies", Macromolecules, vol. 37, No. 20, pp. 7559-7569, (2004).
Sonmez, G. et al., "Red, green, and blue colors in polymeric electrochromics", Advanced Materials, vol. 16, No. 21, pp. 1905-1908, (2004).
Bernhard, S. et al., "Iron(II) and copper(I) coordination polymers: Electrochromic materials with and without chiroptical properties", Inorganic Chemistry, vol. 42, No. 14, pp. 4389-4393, (2003).
Seki, S. et al., "Effect of binder polymer structures used in composite cathodes on interfacial charge transfer processes in lithium polymer batteries", Electrochimica Acta, vol. 50, issues 2-3, pp. 379-383, (2004).
Li, W. et al., "A novel polymer quaternary ammonium iodide and application in quasi-solid-state dye-sensitized solar cells" Journal of Photochemistry and Photobiology A: Chemistry, vol. 170, issue 1, pp. 1-6, (2005).
Kang, J. et al., "Polymer electrolytes from PEO and novel quaternary ammonium iodides for dye-sensitized solar cells", Electrochimica Acta, vol. 48, issue 17, pp. 2487-2491, (2003).
Wang, G. et al., "Gel polymer electrolytes based on polyacrylonitrile and a novel quaternary ammonium salt for dye-sensitized solar cells", Materials Research Bulletin, vol. 39, issue 13, pp. 2113-2118, (2004).
Sun, X-G. et al., "Comb-shaped single ion conductors based on polyacrylate ethers and lithium alkyl sulfonate", Electrochimica Acta, vol. 50, issue 5, pp. 1139-1147, (2005).
Ohno, H. et al., "Development of new class of ion conductive polymers based on ionic liquids", Electrochimica Acta, vol. 50, issues 2-3, pp. 255-261, (2004).
Morita, M. et al., "Ionic conductance behavior of polymeric gel electrolyte containing ionic liquid mixed with magnesium salt", Journal of Power Sources, vol. 139, issues 1-2, pp. 351-355, (2005).
Grätzel, M. "Materials science: Ultrafast colour displays", Nature, vol. 409, pp. 575-576, (2001).
Definition of "Electronic visual display", printed from Wikipedia, the free encyclopedia on Oct. 20, 2014, 6 pages, found at http://en.wikipedia.org/wiki/Electronic_visual_display.
Jheong, H.K. et al., "Electrochromic property of the viologen-anchored mesoporous TiO$_2$ films", Journal of Electroceramics, vol. 17, issue 2-4, pp. 929-932, (2006).
Tebby, Z. et al., "Low-temperature UV-processing of nanocrystalline nanoporous thin TiO$_2$ films: An original route toward plastic electrochromic systems", Chemistry of Materials, vol. 20, No. 23, pp. 7260-7267, (2008).
Arsenault, E. et al., "Periodic macroporous nanocrystalline antimony-doped tin oxide electrode", ACS Nano, vol. 5, No. 4, pp. 2984-2988, (2011).
Liu, F-Q. et al., "Three-dimensional conducting oxide nanoarchitectures: morphology-controllable synthesis, characterization, and applications in lithium-ion batteries", Nanoscale, Supporting Information, pp. S1-S16, (2013).
Jiang, Q. et al., "Fast and low voltage-driven solid-state electrochromics using 3-D conductive FTO nanobead electrodes", Journal of Material Chemistry C, vol. 2, pp. 618-621, (2014).
Ryu, J-H. et al., "Preparation of a multicolored reflective electrochromic display based on monodisperse polymeric microspheres with N-substituted viologen pendants", Journal of Applied Polymer Science, vol. 107, issue 1, pp. 102-108, (2008).
Steuerman, D.W. et al., "Molecular-mechanical switch-based solid-state electrochromic devices", Angewandte, Chemie International Edition, vol. 43, pp. 6486-6491, (2004).
Sotzing, G.A. et al., "Multiply colored electrochromic carbazole-based polymers", Chemistry of Materials, vol. 9, No. 7, pp. 1578-1587, (1997).
Berridge, R. et al., "Electrochromic properties of a fast switching, dual colour polythiophene bearing non-planar dithiinoquinoxaline units", Journal of Materials Chemistry, vol. 17, issue 3, No. 225-231, (2007).

(56) References Cited

OTHER PUBLICATIONS

Durmus, A. et al., "A neutral state green polymer with a superior transmissive light blue oxidized state", Chemical Communications, issue 31, pp. 3246-3248, (2007).
Sonmez, G. et al., "A red, green, and blue (RGB) polymeric electrochromic device (PECD): The dawning of the PECD era", Angewandte Chemie, vol. 116, issue 12, pp. 1524-1528, (2004).
Thompson, B.C. et al., "In situ colorimetric analysis of electrochromic polymers and devices", Chemistry of Materials, vol. 12, No. 6, pp. 1563-1571, (2000).
Schottland, P. et al., "Poly(3,4-alkylenedioxypyrrole)s: Highly stable electronically conducting and electrochromic polymers", Macromolecules, vol. 33, No. 19, pp. 7051-7061, (2000).
Li, X-G. et al., "Synthesis, film-forming, and electronic properties of o-Phenylenediamine copolymers displaying an uncommon tricolor", Macromolecules, vol. 40, No. 5, pp. 1489-1496, (2007).
Beaupré, S. et al., "Toward the development of new textile/plastic electrochromic cells using triphenylamine-based copolymers", Chemistry of Materials, vol. 18, No. 17, pp. 4011-4018, (2006).
Fungo, F. et al., "Plastic electrochromic devices: Electrochemical characterization and device properties of a phenothiazine-phenylquinoline donor-acceptor polymer", Chemistry of Materials, vol. 15, No. 6, pp. 1264-1272, (2003).
Cummins, D. et al., "Ultrafast electrochromic windows based on redox-chromophore modified nanostructured semiconducting and conducting films", The Journal of Physical Chemistry B, vol. 104, No. 48, pp. 11449-11459, (2000).
No. of Pages 8, May 18, 2012, U.S. Appl. No. 12/748,856, US.
No. of Pages 2, Jul. 19, 2012, U.S. Appl. No. 12/748,856, US.
No. of Pages 9, Jul. 23, 2012, U.S. Appl. No. 12/748,856, US.
No. of Pages 13, Dec. 17, 2012, U.S. Appl. No. 12/748,856, US.
No. of Pages 3, Jun. 5, 2013, U.S. Appl. No. 12/748,856, US.
No. of Pages 2, Oct. 29, 2012, U.S. Appl. No. 12/748,856, US.
No. of Pages 3, May 17, 2013, U.S. Appl. No. 12/748,856, US.
No. of Pages 25, Aug. 1, 2014, U.S. Appl. No. 12/748,856, US.
No. of Pages 8, Dec. 19, 2014, U.S. Appl. No. 12/748,856, US.
No. of Pages 32, Mar. 25, 2015, U.S. Appl. No. 13/972,447, US.
No. of Pages 3, Apr. 15, 2015, U.S. Appl. No. 12/748,856, US.
No. of Pages 8, May 11, 2015, U.S. Appl. No. 12/748,856, US.
No of Pages 36, Jun. 5, 2015, U.S. Appl. No. 13/493,830, US.
No. of Pages 7, Jun. 18, 2015, U.S. Appl. No. 12/748,856, US.
No. of Pages 3, Jul. 15, 2015, U.S. Appl. No. 12/748,856, US.
No. of Pages 14, Nov. 23, 2015, U.S. Appl. No. 13/972,447, US.
No. of Pages 3, Jan. 20, 2016, U.S. Appl. No. 13/972,447, US.
No. of Pages 19, Feb. 16, 2016, U.S. Appl. No. 13/493,830, US.
No. of Pages 9, Mar. 29, 2016, U.S. Appl. No. 13/972,447, US.
No. of Pages 5, Apr. 7, 2016, U.S. Appl. No. 13/972,447, US.
No. of Pages 3. Apr. 29, 2016, U.S. Appl. No. 13/493,830, US.
No. of Pages 5, Jun. 2, 2016, U.S. Appl. No. 13/972,447, US.
No. of Pages 4, Jul. 1, 2016, U.S. Appl. No. 13/972,447, US.
Hamann, T.W. et al., "Atomic layer deposition of $TiO_2$ on aerogel templates: new photoanodes for dye-sensitized solar cells", The Journal of Physical Chemistry C, vol. 112, No. 27, pp. 10303-10307, (2008).
Jin, E.M. et al., "Enhancement of the photoelectric performance of dye-sensitized solar cells using Ag-doped $TiO_2$ nanofibers in a $TiO_2$ film as electrode", Nanoscale Research Letters, vol. 7, No. 97, pp. 1-5, (2012).
Gratzel, M. "Photovoltaic and photoelectrochemical conversion of solar energy", Philosophical Transactions of the Royal Society A, vol. 365, pp. 993-1005, (2007).
Yum, J-H. et al., "A cobalt complex redox shuttle for dye-sensitized solar cells with high open-circuit potentials", Nature Communications, vol. 3, article No. 631, pp. 1-8, (2012).
Kim, J-H. et al., "Ga-doped ZnO transparent electrodes with $TiO_2$ blocking layer/nanoparticles for dye-sensitized solar cells", Nanoscale Research Letters, vol. 7, No. 11, pp. 1-4, (2012).
Wang, Z-S. et al., "Photoelectric conversion properties of nanocrystalline $TiO_2$ electrodes sensitized with hemicyanine derivatives" Journal of Physical Chemistry B, vol. 104, No. 41, pp. 9676-9682, (2000).
Yang, A. et al., "Solid dye-sensitized solar cells prepared through a counter strategy for filling of solid hole trasporter", Journal of Renewable and Sustainable Energy, vol. 3, pp. 063101-1-063101-9, (2011).
Wei, D., "Dye sensitized solar cells", International Journal of Molecular Sciences, vol. 11, pp. 1103-1113, (2010).
No. of Pages 4, Mar. 8, 2017, U.S. Appl. No. 13/493,830, US.
No. of Pages 2, Mar. 24, 2017, U.S. Appl. No. 13/493,830, US.
No. of Pages 7, Apr. 3, 2017, U.S. Appl. No. 13/493,830, US.
No. of Pages 3, Apr. 6, 2017, U.S. Appl. No. 13/493,830, US.
No. of Pages 3, Apr. 18, 2017, U.S. Appl. No. 13/493,830, US.
No. of Pages 17, Sep. 1, 2016, U.S. Appl. No. 13/493,830, US.
Liu, F-Q. et al., "Drift transport in Al2O3-sheathed 3-d transparent conducting oxide photoanodes observed in liquid electrolyte-based dye-sensitized solar cells", The Journal of Physical Chemistry C, vol. 118, pp. 9951-9957, (2014).
No. of Pages 27, Oct. 13, 2017, U.S. Appl. No. 13/493,830, US.
U.S. Appl. No. 13/493,830, filed Jun. 11, 2012.

* cited by examiner

US 10,281,791 B2

ELECTROCHROMIC DEVICE HAVING THREE-DIMENSIONAL ELECTRODE

FEDERALLY SPONSORED RESEARCH OR DEVELOPMENT

This invention was made with government support under CBET-1150617 awarded by the National Science Foundation. The government has certain rights in the invention.

BACKGROUND

Electrochromic (EC) devices have been attracting widely-spread attention as they can be used as smart windows and electronic displays. In particular, recent research and development progress in organic and polymer electrochromic materials exhibiting different voltage-dependent colors makes EC devices a strong candidate for sunlight-readable exterior displays. Typically, an EC device includes an electrochromic material between two electrodes and in contact with an electrolyte. A porous layer, referred to as the docking layer, is prepared from a suitable semiconductor material such as $TiO_2$ or ZnO, attached to one of the electrodes and separated from the other electrode by the electrolyte. The electrochromic material is absorbed or attached to the docking layer. When a high enough voltage is applied, the electrochromic material is reduced or oxidized, and changes color. For example, diethyl viologen diiodine is an electrochromic material which is coloress, and becomes darkly colored upon reduction.

However, the quest for electrochromic display technology often suffers from the dilemma of the thickness of the docking layer and the resulting slow charge diffusion that limits the switching speed of electrochromic device. Explicitly, a film with a large surface area such as a $TiO_2$ nanoparticulate film or a polymer film is often desired to load enough electrochromic materials for sufficient color contrast, but at a cost of high driving voltage and slow response time due to the large series resistance and slow electron mobility in the docking layer. Once an electric leak occurs between the two electrodes, the high voltage will immediately drop on the electrolyte, resulting in dielectric breakdown of the electrolytes and active electrochromic material, thus deteriorating the lifetime of the device.

SUMMARY

In a first aspect, the present invention is an electrochromic device, comprising (i) a conductive layer, (ii) an electrochromic material, on the conductive layer (iii) an electrolyte, on the electrochromic material, and (iv) a counter-electrode, on the electrolyte. The conductive layer has a surface roughness factor (SRF) of at least 10, and the conductive layer comprises a semi-metal.

In a second aspect, the present invention is an electrochromic device, comprising (i) a conductive layer, (ii) an electrochromic material, on the conductive layer (iii) an electrolyte, on the electrochromic material, and (iv) a counter-electrode, on the electrolyte. The conductive layer has a surface roughness factor (SRF) of at least 10, and the electrochromic material is not Ni oxide or hydroxide.

In a third aspect, the present invention is an electrochromic display, comprising a plurality of the electrochromic devices.

In a fourth aspect, the present invention is a process of preparing an electrochromic device, comprising forming a conductive layer, having a SRF of at least 10, applying an electrochromic material onto the conductive layer, and preparing the electrochromic device using the conductive layer and the electrochromic material. The conductive layer comprises a semi-metal.

DEFINITIONS

Surface roughness factor (SRF) is the surface area divided by the projected substrate area. The surface area is determined by measuring the BET surface area.

Response time of an EC device is the greater of the coloring or de-coloring response time. The coloring response time is the time the device takes to go from a de-colored state to a colored state, using 75% of the coloring of the full colored state as an end-point. The de-coloring response time is the time the device takes to go from a colored state to a de-colored state, using 75% of the de-coloring of the fully de-colored state as an end-point. The response time is determined using the coloring voltage, where the fully colored or fully de-colored state is achieved using the coloring voltage. Preferably, the response time of the EC device is at most 1 second, more preferably at most at most 750 ms, even more preferably at most 500 ms, and most preferably at most 400 ms.

Coloring voltage of an EC device is the lowest voltage necessary to go from a de-colored state to 75% of the most fully colored states achievable with higher voltages. Preferably, the coloring voltage is at most 3V, more preferably at most 2V, even more preferably at most 1V, and most preferably at most 0.9V.

DETAILED DESCRIPTION

The present invention makes use of the discovery that replacing the semiconductor docking layer, with a conductive layer having a surface roughness factor (SRF) of at least 10, dramatically improves the response time and reduces the driving voltage of the EC device. Preferably, the conductive layer is a semimetal, including n-type degenerate semiconductors such as fluorinated tin oxide (FTO), aluminum-zinc oxide (AZO), antimony-tin oxide (ATO) or indium-tin oxide (ITO), which are transparent. Preferably, the electrochromic material is an organic compound or polymer, rather than a metal oxide.

Figure 1A:
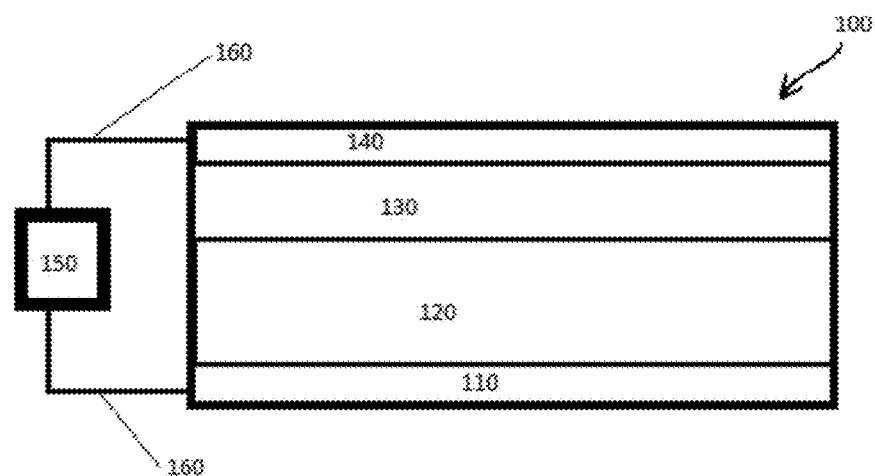
FIGS. 1A and 1B show schematic diagrams of an EC device.

An EC device, 100, is illustrated in FIG. 1A, where components are not shown to scale. The EC device includes an optional substrate, 110, an active layer, 120, on the substrate, an electrolyte layer, 130, on the active layer, and a counter-electrode, 140, on the electrolyte layer. Also illustrated in the figure are electrical leads, 160 and 160, which electrically connect a power source, 160, to the EC device. The power source drives and controls the color change of the EC device.

Figure 1B:
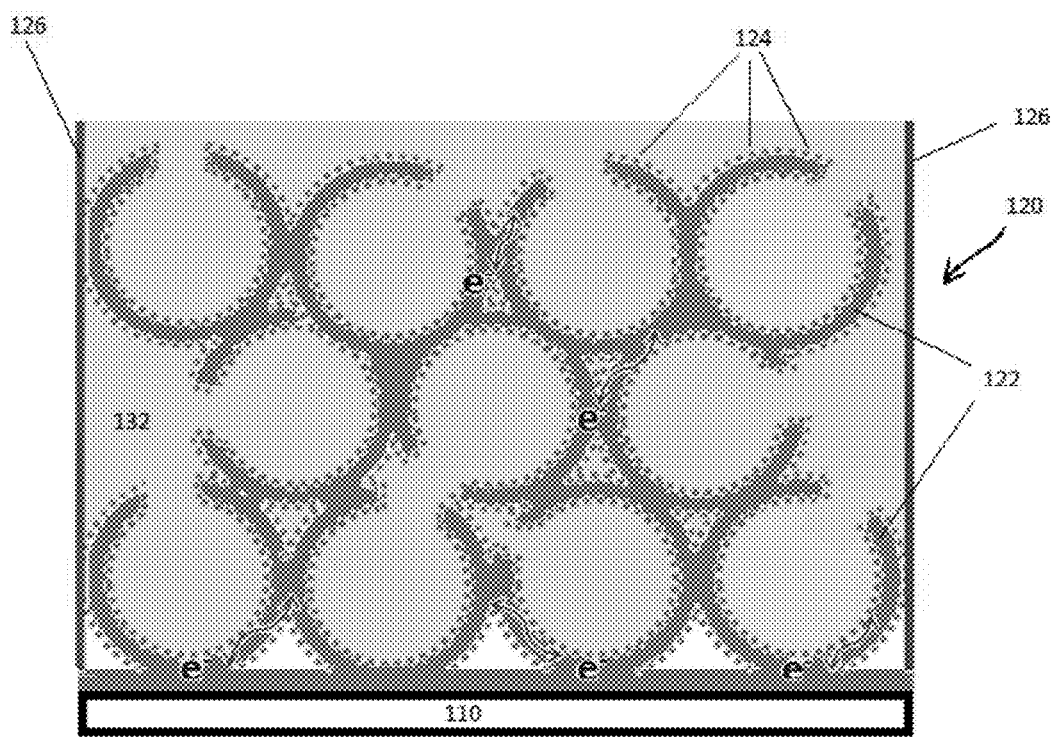

FIG. 1B, also not to scale, shows details of the active layer, 120. The active layer includes a conductive layer, 122, which has a surface roughness factor of at least 10. On the conductive layer is the electrochromic material, 124. In contact with the electrochromic material is an electrolyte, 132; the electrolyte is also present in the electrolyte layer. Also illustrated is sealing layer, 126, which may extend the full length of the EC device, and which separates, seals and/or insulates the EC device. In the illustration, arrows indicate possible electrically conductive pathways through the conductive layer.

Figure 6:
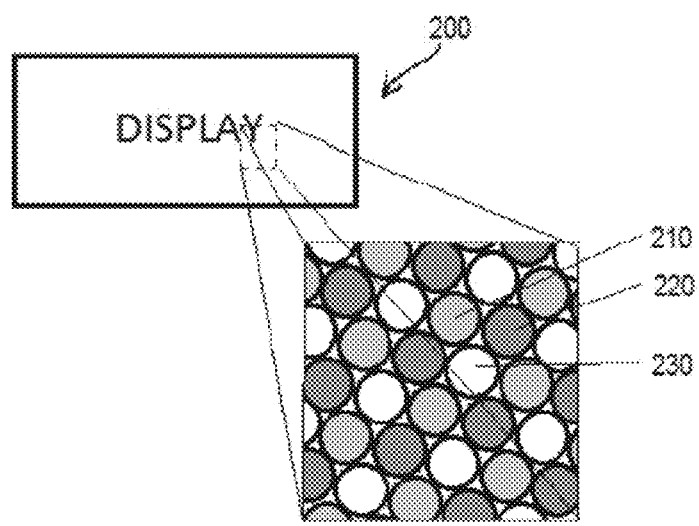
FIG. 6 is a schematic diagram of an EC display, which an enlarged portion showing the individual EC devices which make up a portion of the EC display.

An EC display, 200, is illustrated in FIG. 6, which is not shown to scale. The figure shows an enlarged portion of the display, which is composed of a plurality of independently addressable EC devices, which each EC device being a single pixel or section of the EC display. As shown in the figure, the EC device of the display may be different colors, preferably 3 different colors, such as a first color, 210, a second color, 220, and a third color, 230. Examples of preferred colors are red, green and blue.

Preferably, the substrate and the conductive layer are transparent, so that light may pass through the device when the electrochromic material is colorless or lightly colored, improving contrast. Alternatively, the substrate and/or the conductive layer are white, again to provide improved contrast Examples of substrates include glass, quartz and transparent polymeric materials, such as polycarbonate. Examples of transparent conductive layers include indium-tin oxide, fluorinated tin oxide, and aluminum-zinc oxide. These transparent conductive materials are semimetals. The conductive layer may also be formed as a composite material and/or formed as multiple layers. For example, a planar substrate of glass may be coated with a layer of fluorinated tin oxide, and fine particles of fluorinated tin oxide applied to the surface and sintered together to provide the substrate and conductive layer.

A variety of techniques may be used to provide a conductive layer with a SRF of at least 10. For example, a planar substrate may be coated with a layer of conductive material, and then fine particles of the conductive material may be applied to the coated substrate and sintered together. Alternatively, a substrate may be etched to provide a substrate with a SRF of at least 10, and then coated with a conductive layer, providing a conductive layer with a SRF of at least 10. Preferably the conductive layer may have a SRF of at least 20, at least 50, at least 100, at least 400, or at least 500, including 15, 25, 30, 40, 45, 60, 70, 80, 90, 150, 200, 300, 530, 600, 700, 800, 900 and 1000.

In another alternative, a template material and a precursor of the conductive layer material may be used to form a conductive layer with an SRF of at least 10. The template may be ordered or disordered. Examples include a disordered template of polystyrene beads, which may be prepared by mixing the polystyrene beads with a precursor solution; applying a layer of the mixture to a substrate, then drying followed by sintering. An ordered template of polystyrene beads may also be used to form a conductive layer having an SRF of at least 10 (Yang et al., "Three-Dimensional Photonic Crystal Fluorinated Tin Oxide (FTO) Electrodes: Synthesis, Optic and Electrical Properties" *ACS Applied Materials & Interfaces* 2011, 3, 1101). For example, polystyrene beads having a diameter of 100 to 1000 nm, including 150, 200, 250, 300, 350, 400, 450, 500, 550, 600, 650, 700, 750, 800, 850, 900 or 950 nm, may be used. Multiple layers may also be formed, where each layer or set of layers is formed using different sizes of polystyrene beads. Subsequent etching or an increase in the total number of layers may be used to increase the SRF of the structure.

Electrochromic materials fall into two broad classes: organic electrochromic materials, including organic molecules, organic polymers, organometallic molecules, and organometallic polymers; and inorganic electrochromic materials, including metal oxides and hydroxides. Preferably, the electrochromic material is an organic electrochromic material. Examples of organic electrochromic materials include viologens, which may be found in many different colors, including red, green and blue (G. Bar, et al. "RGB organic electrochromic cells" *Solar Energy Materials & Solar Cells* 99 (2012) 123-128; X. Tu, et al. "The synthesis and electrochemical properties of cathodic-anodic composite electrochromic materials" *Dyes and Pigments* 88 (2011) 39-43); violene/cyanine hybrids (S. Hünig, et al. "Violene/cyanine hybrids: a general structure for electrochromic systems" *Chemistry—A European Journal* Vol. 5, Issue 7 (1999) 1969-1973); metalloviologens (D. G. Kurth, et al. "A new Co(II)-metalloviologen-based electrochromic material integrated in thin multilayer films" *Chem. Commun.* (2005) 2119-2 121); organometallic complexes (F. Pichot, et al. "A Series of Multicolor Electrochromic Ruthenium(II) Trisbipyridine Complexes: ☐ Synthesis and Electrochemistry" *J. Phys. Chem. A,* 103 (31), 6263-6267 (1999)); phenothiazines (M. Grätzel "Materials science: Ultrafast colour displays" *Nature* 409 (2001) 575-576); organic polymers (B. D. Reeves, et al. "Spray Coatable Electrochromic Dioxythiophene Polymers with High Coloration Efficiencies" *Macromolecules,* 37 (20), 7559-7569 (2004); G. Sonmez, et al. "Red, Green, and Blue Colors in Polymeric Electrochromics" *Advanced Materials* 16 (21) 1905-1908 (2004)); and organometallic polymers (S. Bernhard, et al. "Iron(II) and Copper(I) Coordination Polymers: ☐ Electrochromic Materials with and without Chiroptical Properties" *Inorg. Chem.* 42 (14), 4389-4393 (2003)). Preferably, an EC display will include EC devices with at least 3 different colors, for example red, green and blue.

The electrochromic material may be applied to the conducting layer by applying a solution of the electrochromic material to the conducting layer, or by vapor phase deposition.

Although inorganic electrochromic materials are possible, they are less preferred, and preferably inorganic electrochromic materials are not use, more preferably metal oxides are not used. Examples of inorganic electrochromic materials include oxides and hydroxides Ni, W, Ti, Mo and Ir. Metal oxide electrochromic materials are less preferred, because they are usually formed by oxidizing a metal framework, requiring the conducting layer to be formed of the metal or a compound of the metal. In these cases, only a single electrochromic material will be present (the metal oxide), preventing the formation of an EC display which includes more than a single color of electrochromic material. Furthermore, the metal or compound of the metal which forms the conducting layer may no be white or transparent, reducing the contrast available with the device.

An electrolyte, present in the conducting layer and which forms the electrolyte layer, may be a liquid, polymer, or an ionic liquid. Liquid electrolytes include solutions of one or more salts dissolved in one or more polar solvents; examples of solvents include water, alcohols, N-methylformamide (NMF), propylene carbonate (PC) and dimethyl sulfoxide (DMSO); examples of salts include $NH_4I$, LiCl, $LiClO_4$, NaCl, and $Na_2SO_4$. Preferably, the solvent is a non-aqueous solvent. A liquid electrolyte may be a sol-gel electrolyte, which is a liquid electrolyte containing a gelling agent; examples of gelling agents included polymers and copolymers which are soluble in the solvent of the liquid electrolyte, or which can be polymerized in situ by adding the appropriate monomer to the liquid electrolyte follow by initiation of the polymerization reaction. Examples of gelling agents include polyvinyl alcohols, copolymers of acrylates and methacrylates, polyacrylonitrile, polyethylene oxide, polyethylene glycol and polyvinylpyrrolidone (S. Seki, et al. "Effect of binder polymer structures used in composite cathodes on interfacial charge transfer processes in lithium polymer batteries" *Electrochimica Acta*, Vol. 50, Issues 2-3 (2004) 379-383). Polymer electrolytes are electrolytes where the ions of the electrolyte include a polymer (W. Li, et al. "A novel polymer quaternary ammonium iodide and application in quasi-solid-state dye-sensitized solar cells" *Journal of Photochemistry and Photobiology A: Chemistry*, Vol. 170, Issue 1 (2005), 1-6; J. Kang, et al. "Polymer electrolytes from PEO and novel quaternary ammonium iodides for dye-sensitized solar cells" *Electrochimica Acta*, Vol. 48, Issue 17 (2003) 2487-2491; G. Wang, et al. "Gel polymer electrolytes based on polyacrylonitrile and a novel quaternary ammonium salt for dye-sensitized solar cells" *Materials Research Bulletin* Vol. 39, Issue 13 (2004) 2113-2118; X.-G. Sun, et al. "Comb-shaped single ion conductors based on polyacrylate ethers and lithium alkyl sulfonate" *Electrochimica Acta*, Vol. 50, Issue 5 (2005) 1139-1147). Ionic liquids are salts which are liquid at or near room temperature, and may not require the presence of a solvent (H. Ohno, et al. "Development of new class of ion conductive polymers based on ionic liquids" *Electrochimica Acta*, Vol. 50, Issues 2-3 (2004) 255-261; M. Morita, et al. "Ionic conductance behavior of polymeric gel electrolyte containing ionic liquid mixed with magnesium salt" *Journal of Power Sources*, Vol. 139, Issues 1-2 (2005) 351-355). The electrolyte may be applied as a liquid. In the case of non-liquid electrolytes, a solution may be applied, allowing the solvent to evaporate. In the case of solid polymer electrolyte, in situ polymerization of monomers by be carried out, using a solution of the monomer or a neat mixture of the monomers.

The counter electrode is a transparent conducting material, which may optionally be present on the surface of a substrate material. Examples include indium-tin oxide, fluorinated tin oxide, antimony-tin oxide and aluminum-zinc oxide, or any of these materials on glass, quartz or transparent polymeric materials, such as polycarbonate.

The sealing layer may be any material which prevent contamination of the device from the outside environment, and which prevents liquid electrolyte from leaking out of the device. Sealing layer materials include metals, plastics, epoxy resins and polydimethylsiloxane (PDMS).

EXAMPLES

In this example is shown that a conductive 3-dimensional FTO hollow nanobead electrode can significantly enhance the response time of EC devices to less than 300 ms, a factor 10 enhancement in comparison to the conventional solid-state EC devices using $TiO_2$ nanoparticle film as a docking layer on a planar FTO electrodes. Meanwhile, the driving voltage can be reduced to less than 1.2 V and the devices show excellent reversibility and stability after nearly 4000 cycles. In perspective, the fast electron transport in the 3-dimensional conductive nanobead electrodes provides a feasible way to overcome the persistence of vision for future sun-light readable and low-energy driven EC display technology as well as other electrochemical processes.

This approach is fundamentally advanced over current effort of alternating the morphology of docking materials from $TiO_2$ or ZnO nanoparticles to nanowires and other nanostructures. In particular, FTO has a high conductivity over >$10^3$ S/cm, ($10^7$ times greater than $TiO_2$ nanoparticle film) due to its high carrier concentration (>$10^{20}/cm^3$) and carrier mobility (65 $cm^2V^{-1} s^{-1}$).

The device configuration is illustrated in FIG. 1B. Hollow 3-dimensional FTO nanobeads (~200 nm in diameter) were sintered on a flat FTO glass as one electrode and another flat FTO glass as counter electrode. Diethyl viologen diiodine was chosen as the electrochromic material for the high stability of the viologen coloration state. The viologen molecules can be absorbed on both the inner and outer surfaces of the FTO nanobead electrode due to the small apertures (50 nm) on each FTO nanobead, which also allows the infiltration of the PMMA-P(VAc-MA)+$LiClO_4$-based sol-gel electrolyte, thereafter. The FTO nanobead electrodes were prepared by a morphology-controllable and template-assisted evaporative co-assembly method (Liu, F. Q., et al. "Three-dimensional conducting oxide nanoarchitectures: morphology-controllable synthesis, characterization, and applications in lithium-ion batteries" *Nanoscale* 2013, 5, 6422) and also briefly described below.

Preparation of FTO Nanobeads:

In a typical preparation process of FTO hollow nanobeads, 24 mg of $SnCl_2.2H_2O$, 4.5 mg of $NH_4F$ and 450 µl water were mixed and magnetically stirred for 2 hours. Then, 275 µl 200 nm PS suspension was added in the mixture, followed by stirring for 24 hours. 50 µl of the resulting suspension was spread on 1.0 inch×1.0 inch commercial FTO substrate with scotch tape to define the area. The samples were dried at room temperature overnight, following by 2 hours at 170° C., 3 hours at 340° C. and 2 hours at 450° C. with heating rate 1° C./min. This process yields approximately 15-20 µm 3-dimensional FTO hollow nanobead film. The samples were then treated at 300° C. in argon for 30 min to improve the electrical conductivity with temperature rising rate of 1° C./min.

Preparation of PMMA-P(VAc-MA)+$LiClO_4$-Based Sol-Gel Electrolytes 0.13 g of PMMA (polymethyl methacrylate) and 0.28 g copolymer of VAc/MA (vinyl acetate/methyl acrylate) was dissolved in 1 ml PC, 0.1 g $LiClO_4$ was added and stirred overnight.

Electrochromic Characterization

A square wave voltage was supplied by a function generator (Agilent 33220A) to powder the EC devices. The voltage can be switched on from 0V to a given value between ±5V within 50 ns. The periods of the alternating square wave voltage can be set for different values as needed such as 8 s, 4 s, 2 s, 1 s, 0.5 s and 0.3 s used in the tests.

Reflection vs. time of device was measured by the strip-chart function on UV-Vis spectrometer (Ocean Optic USB2000). The optic probe was placed on the sample holder and attached on the surface of the device.

Temperature dependent measurements were conducted by placing the EC device in a car cooler (Wagon Tech) that can adjust the temperature between 3-70° C. A thermocouple was taped on to the surface of the device to precisely record the actual sample temperature.

Figure 2A:
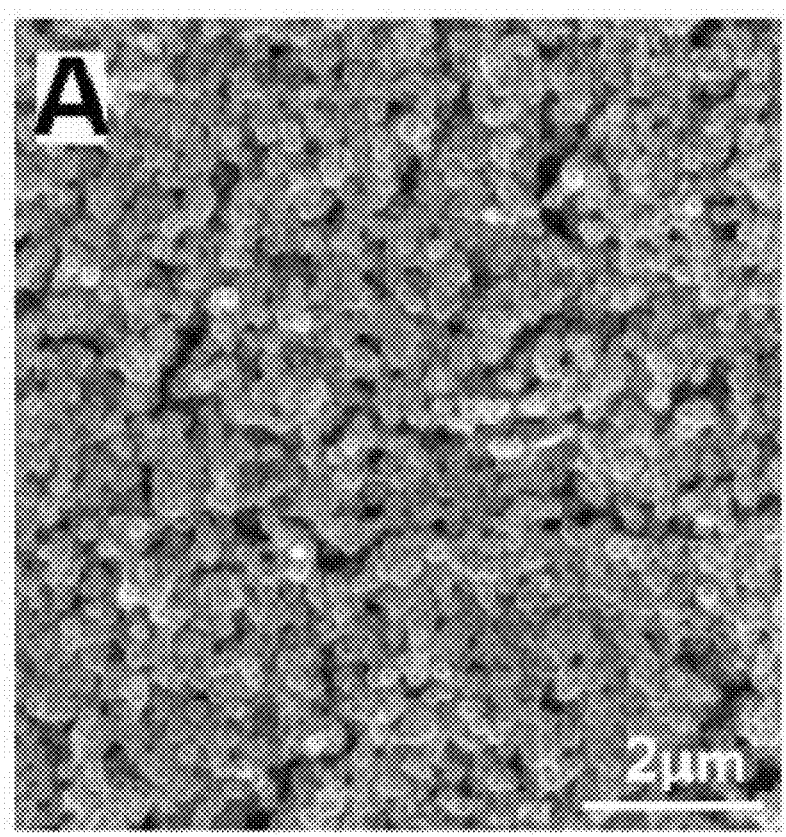
FIGS. 2A, 2B, 2C and 2D show SEM images of 3-dimensional conductive FTO hollow nanobeads: (2A) Topview; (2B) Cross-section; (2C) Magnified image of individual FTO nanobeads; (2D) FTO nanobeads coated with viologen.
Figure 2B:
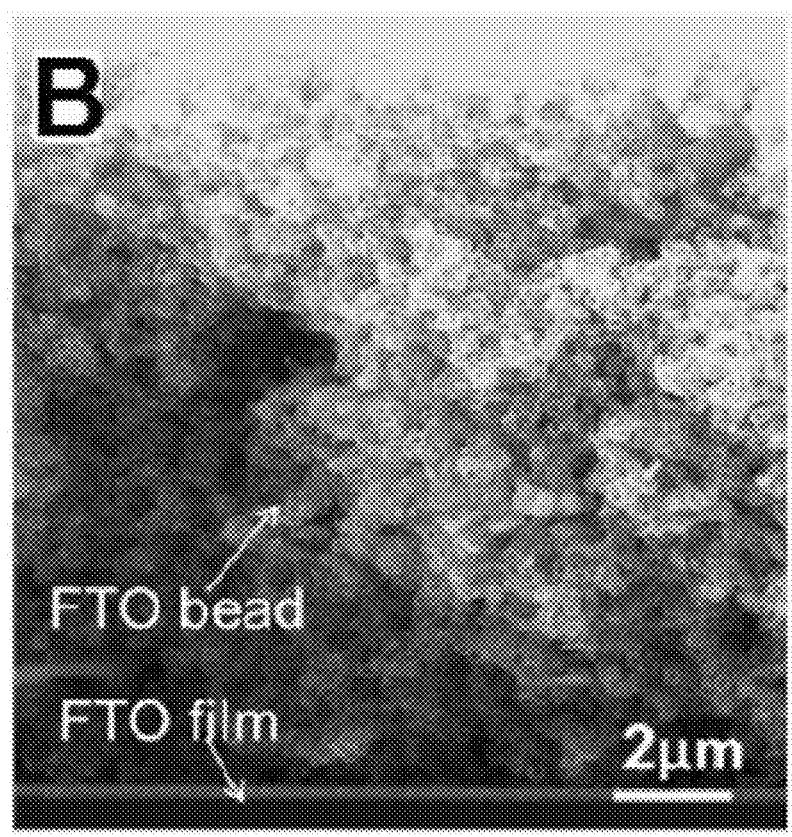
Figure 2C:
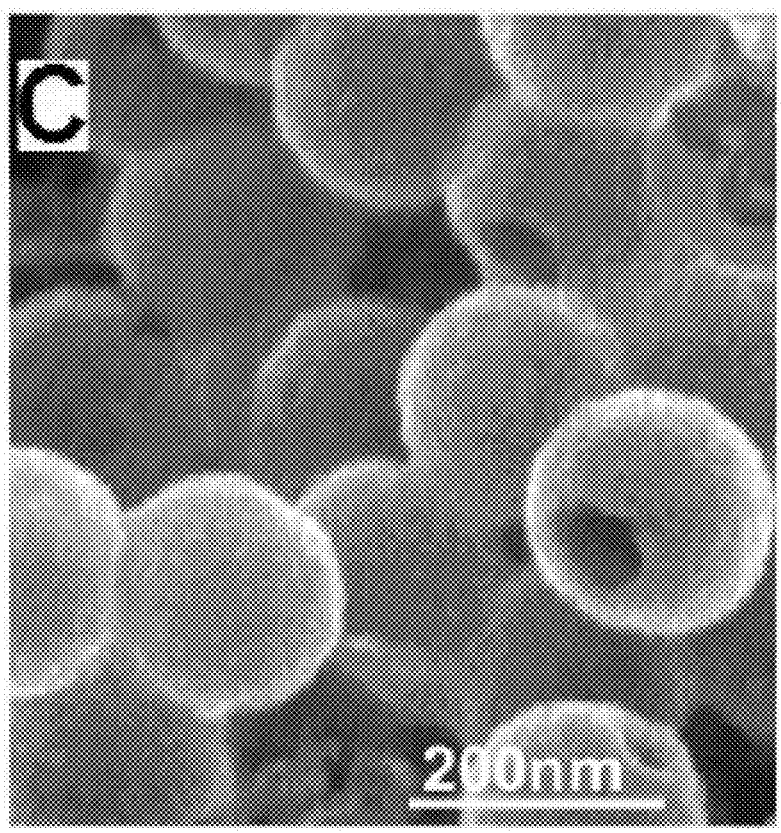
Figure 2D:
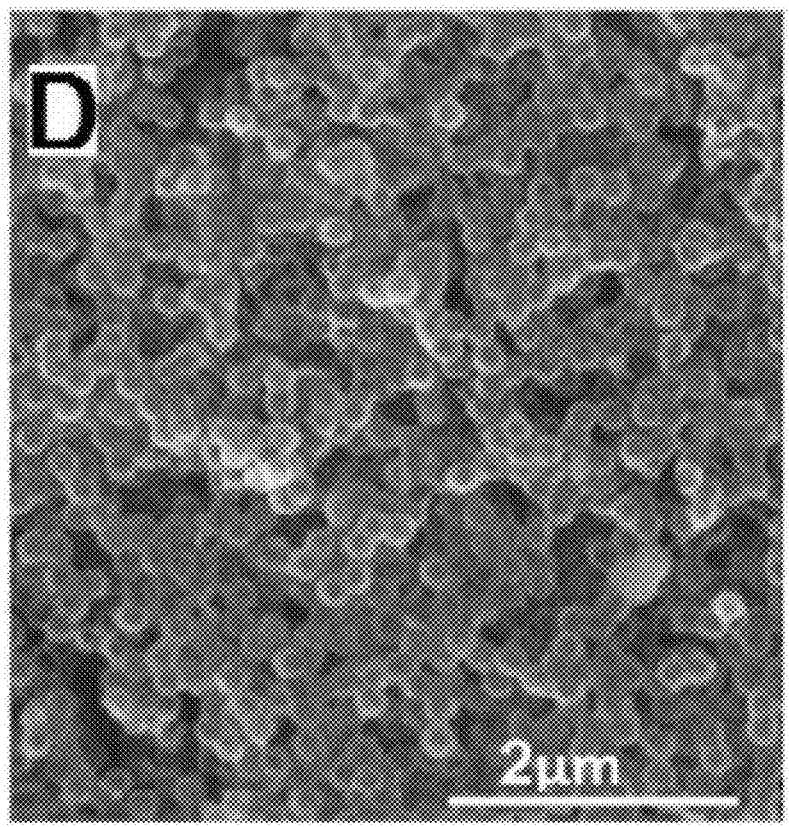

FIG. 2a shows the SEM top view of the FTO nanobead film. FIG. 2b is the cross-section of FTO nanobeads on ITO glass, showing that the thickness of FTO nanobead layer is about 18 μm. FIG. 2c is a magnified SEM image of the FTO nanobeads with apertures of about 50 nm resulting from the release of gaseous species from the decomposed templating polystyrene nanobeads calcinated at 450° C. These openings offer the passages for the sol-gel electrolytes to pass through. FIG. 2d is the SEM image of FTO beads after viologens were absorbed. Our previous $N_2$ adsorption/desorption isotherms study shows that the BET surface area of 200 nm 3-dimensional FTO nanobeads is 53 $m^2/g$, and the measured mass per unit projected area of the FTO nanobead film with a thickness of 18 um is ~1 $mg/cm^2$. Thus, the surface roughness factor (effective surface area/projected substrate area) of this 18 um thick FTO nanobeads film is over ~530. The sheet resistance of the film was measured to be 27 Ω/square, indicating the excellent conductivity of the nanobead electrodes.

Figure 3A:
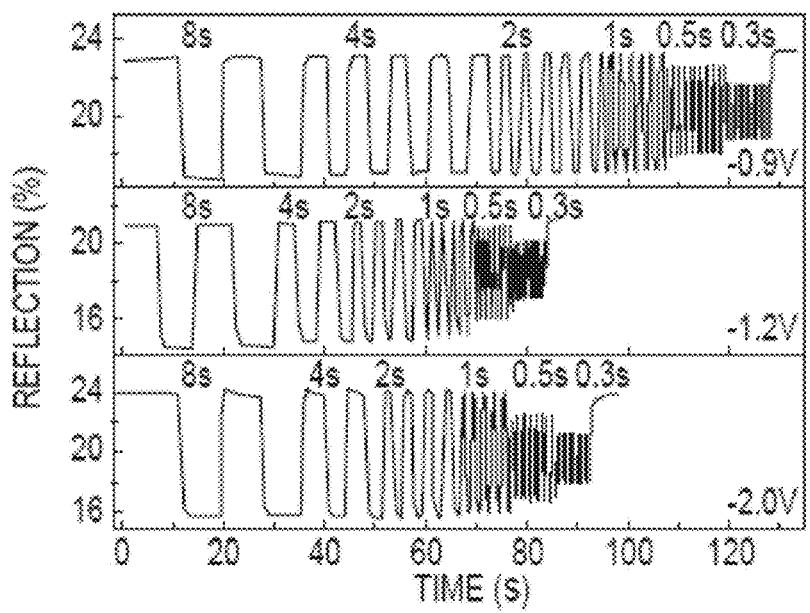
FIGS. 3A and 3B illustrate reflection and response time of an EC device: (3A) Reflection at 580 nm at different driving voltages; (3B) Response time analysis of EC device.

The device is driven by an alternating square-wave voltage supplied by a function generator, which is capable of alternating the polarity of voltage with a time resolution of 50 ns. The rate of the color change driven by the applied voltage, i.e. electrochromic effect, can be characterized by measuring the time-resolved reflectance (at a resolution of 20 ms) of the device at 580 nm, around which the first reduced state of viologen exhibits a wide absorption band. The lowest observed coloring voltage was −0.8 V, which is very close to the first reduction for most of alkyl substituted viologens $V^{2+} \rightarrow V^+$. FIG. 3a shows the real-time reflectance of the device at 580 nm vs. time driven by different square wave voltages (±0.9 V, ±1.2 V and ±2.0V). At −0.9 V (the negative voltage is defined as when the FTO nanobead electrode is negatively biased, and the flat counter electrode is positively biased) with periods of 8 s, 4 s, 2 s, and 1 s, the device shows a Δ6.1% reduction in reflection between fully de-colored and colored state. Further shortening the periods decreases the change of reflectance to 5% at period of 0.5 s. The device shows Δ6.7% and Δ8% reflectance change between de-colored and colored states at driving voltage of −1.2 V and −2V, respectively. Although the absolute change of the reflectance is not high due to single-wavelength measurement, the device clearly shows the change of color from pale yellow to blue. Three video clips exhibit the visual effect of the rapid coloring-decoloring cycling driven by 0.9V square wave with periods of 100 ms, 200 ms and 600 ms, respectively.

Figure 3B:
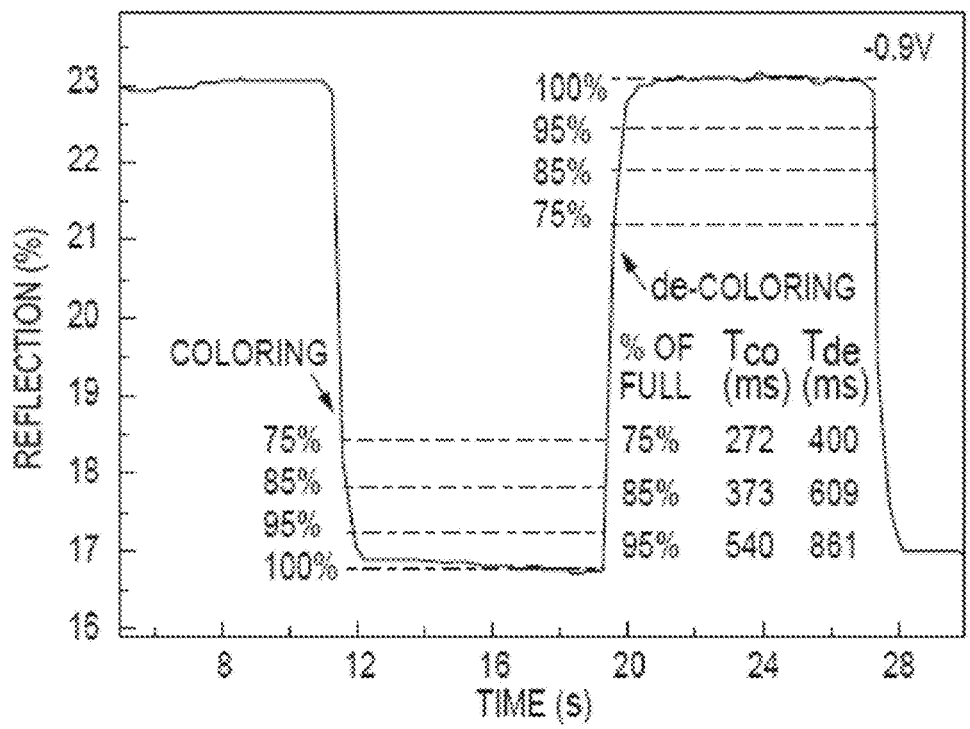

FIG. 3b shows the response times of the coloring and de-coloring processes at ±0.9V. To assure a fair comparison with literature reported response times of the flat FTO electrode-based EC devices, the response times with respect to the 75%, 85% and 95% of the full color or de-color change was adopted. At −0.9 V, the response time is ~270 ms for reaching 75% coloring state and ~400 ms for reaching 75% de-coloring state, respectively. Even for 95% coloring and de-coloring state, the response time is only 540 ms and 861 ms, respectively, in contrast to the 2~3 s response time of the conventional EC devices using $TiO_2$ nanoparticles as the docking layer.

We also conducted temperature-dependent response time measurement in comparison with the temperature-dependent resistance of 3-dimensional FTO nanobead electrode and temperature-dependent resistance of the polymer electrolytes.

TABLE 1

Response Time vs Temperature defined at different change of percentage

| Temp/K | $T_{co}$/ms 75% Co | $T_{de}$/ms 75% De | $T_{co}$/ms 85% Co | $T_{de}$/ms 85% De | $T_{co}$/ms 95% Co | $T_{de}$/ms 95% De |
|---|---|---|---|---|---|---|
| 279.55 | 532 | 1040 | 803 | 1533 | 1230 | 2327 |
| 287.55 | 422 | 604 | 689 | 937 | 931 | 1216 |
| 296.65 | 272 | 400 | 373 | 609 | 540 | 861 |
| 307.65 | 216 | 429 | 332 | 385 | 422 | 854 |
| 317.75 | 137 | 266 | 240 | 385 | 359 | 528 |
| 327.55 | 117 | 167 | 194 | 221 | 275 | 353 |

Figure 4A:
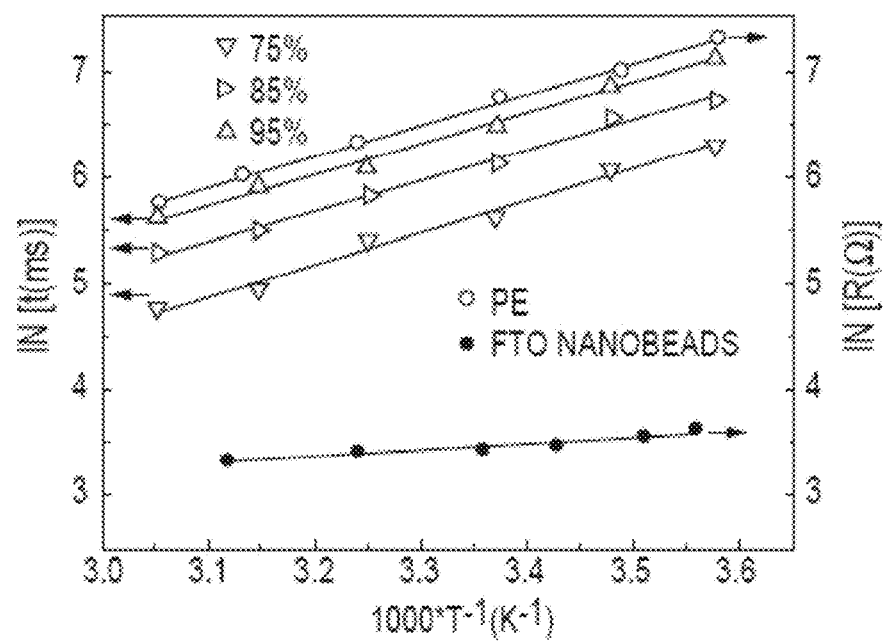
FIGS. 4A and 4B illustrate response time and reversibility of an EC device: (4A) Arrhenius plots: response time of coloring at different temperature at −0.9V; (4B) Reversibility test of EC device.

$T_{co}$: response time of coloring process
$T_{de}$: response time of decoloring process
Co: coloring
De: decloring This study provides insights on the rate-limiting steps of the EC process in the device. As shown in FIG. 4a, the Arrhenius plot of response time increase as temperature decreases at a slope of 2.99 (at 75% color change). In contrast, the Arrhenius plot of resistance of polymer electrolytes increases as temperature decreases at a slope of 2.89, due to the decrease of ion mobility (i.e., kinetics) at lower temperature. Apparently, the resistance of the 3-dimensional FTO nanobead electrode (slope of 0.56) has much less temperature dependence than the device response time and the resistance of polymer electrolytes. Since the slope of the Arrhenius plot of response time reflects the kinetic activation energy of the EC process, while the overall EC process involves three steps, including electron transport in the FTO nanobead layer, ion transport in polymer electrolytes and the redox reaction of the viologen. The comparison of the degree of the slopes of the Arrhenius plots indicates that the response time is mainly limited by the relatively slow ion transport in the electrolytes, instead of the electron transport in the FTO nanobead electrodes.

Figure 4B:
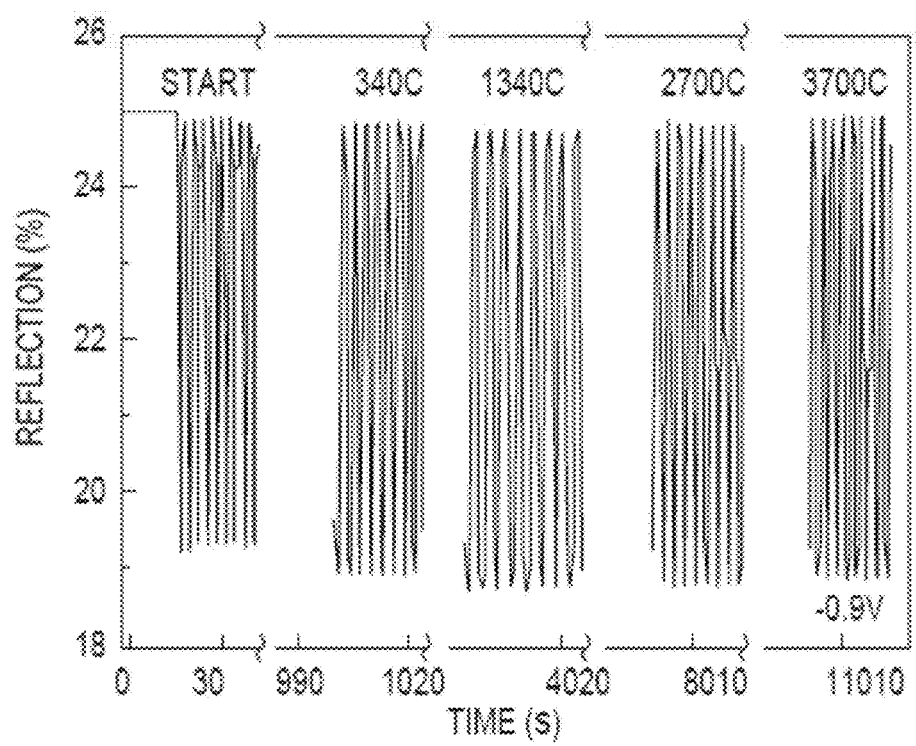
Figure 5:
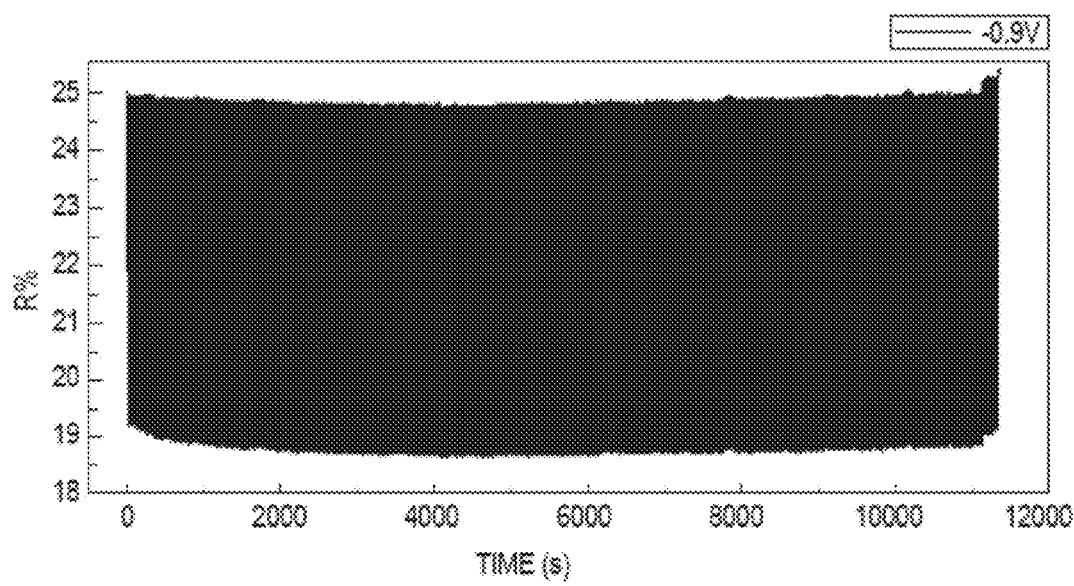
FIG. 5 is a full graph of the reversibility test at ±0.9V of an EC device.

The reversibility of the device was further studied by applying cycling to the device at ±0.9V. After more than 3700 EC cycles (see FIG. 4b), no obvious decrease of performance was observed. The complete cycling graph is shown in FIG. 5.

REFERENCES

Jain, V.; Yochum, H. M.; Montazami, R.; Heflin, J. R. *Appl Phys Lett* 2008, 92, 3.

Kim, S. H.; Shim, N.; Lee, H.; Moon, B. *J Mater Chem* 2012, 22, 13558.

Beaujuge, P. M.; Reynolds, J. R. *Chem Rev* 2010, 110, 268.

Gunbas, G.; Toppare, L. *Chem Commun* 2012, 48, 1083.

Sonmez, G.; Sonmez, H. B.; Shen, C. K. E.; Wudl, F. *Adv Mater* 2004, 16, 1905.

Gratzel, M. *Nature* 2001, 409, 575.

Choi, S. Y.; Mamak, M.; Coombs, N.; Chopra, N.; Ozin, G. A. *Nano Lett* 2004, 4, 1231.

Jain, V.; Khiterer, M.; Montazami, R.; Yochum, H. M.; Shea, K. J.; Heflin, J. R. *Acs Appl Mater Inter* 2009, 1, 83.

Timothy P. Brewster, S. J. K.; Stafford W. Sheehan, Lauren A. Martini, Charles A. Schmuttenmaer, Victor S. Batista, Robert H. Crabtree *Inorg Chem* 2013, 52, 6750.

Yang, Z. Z.; Gao, S. M.; Li, T.; Liu, F. Q.; Ren, Y.; Xu, T. *Acs Appl Mater Inter* 2012, 4, 4419.

Abraham, K. M.; Jiang, Z.; Carroll, B. *Chem Mater* 1997, 9, 1978.

Li, J.; Yao, W. H.; Meng, Y. S.; Yang, Y. *J Phys Chem C* 2008, 112, 12550.

Byker, H. J. *Electrochim Acta* 2001, 46, 2015.

Liu, F. Q.; Wu, H. Li, T. Grabstanowicz, R. L. Amine, K. Xu, T *Nanoscale* 2013, 5, 6422.

Cho, S. I.; Kwon, W. J.; Choi, S. J.; Kim, P.; Park, S. A.; Kim, J.; Son, S. J.; Xiao, R.; Kim, S. H.; Lee, S. B. *Adv Mater* 2005, 17, 171.

Freitag, M.; Galoppini, E. *Langmuir* 2010, 26, 8262.

Moller, M. T.; Asaftei, S.; Corr, D.; Ryan, M.; Walder, L. *Adv Mater* 2004, 16, 1558.

Wu, H.; Hu, L. B.; Carney, T.; Ruan, Z. C.; Kong, D. S.; Yu, Z. F.; Yao, Y.; Cha, J. J.; Zhu, J.; Fan, S. H.; Cui, Y. *J Am Chem Soc* 2011, 133, 27.

Calnan, S.; Tiwari, A. N. *Thin Solid Films* 2010, 518, 1839.

Li, Z. Y.; Wang, C. M.; Persaud, L.; Mallouk, T. E. *J Phys Chem-Us* 1988, 92, 2592.

Yang, X. H.; Zhu, G.; Wang, S. H.; Zhang, R.; Lin, L.; Wu, W. Z.; Wang, Z. L. *Energ Environ Sci* 2012, 5, 9462.

Saito, Y.; Kataoka, H.; Stephan, A. M. *Macromolecules* 2001, 34, 6955.

Yang et al., "Three-Dimensional Photonic Crystal Fluorinated Tin Oxide (FTO) Electrodes: Synthesis, Optic and Electrical Properties" *ACS Applied Materials & Interfaces* 2011, 3, 1101.

G. Bar, et al. "RGB organic electrochromic cells" *Solar Energy Materials &Solar Cells* 99 (2012) 123-128.

X. Tu, et al. "The synthesis and electrochemical properties of cathodic-anodic composite electrochromic materials" *Dyes and Pigments* 88 (2011) 39-43.

S. Hünig, et al. "Violene/cyanine hybrids: a general structure for electrochromic systems" *Chemistry—A European Journal* Vol. 5, Issue 7 (1999) 1969-1973.

D. G. Kurth, et al. "A new Co(II)-metalloviologen-based electrochromic material integrated in thin multilayer films" *Chem. Commun.* (2005) 2119-2 121.

F. Pichot, et al. "A Series of Multicolor Electrochromic Ruthenium(II) Trisbipyridine Complexes: ☐ Synthesis and Electrochemistry" *J. Phys. Chem. A*, 103 (31), 6263-6267 (1999).

B. D. Reeves, et al. "Spray Coatable Electrochromic Dioxythiophene Polymers with High Coloration Efficiencies" *Macromolecules*, 37 (20), 7559-7569 (2004).

G. Sonmez, et al. "Red, Green, and Blue Colors in Polymeric Electrochromics" *Advanced Materials* 16 (21) 1905-1908 (2004).

S. Bernhard, et al. "iron(II) and Copper(I) Coordination Polymers: ☐ Electrochromic Materials with and without Chiroptical Properties" *Inorg. Chem.* 42 (14), 4389-4393 (2003).

S. Seki. et al. "Effect of binder polymer structures used in composite cathodes on interfacial charge transfer processes in lithium polymer batteries" *Electrochimica Acta, Vol. 50*, Issues 2-3 (2004) 379-383.

W. Li, et al. "A novel polymer quaternary ammonium iodide and application in quasi-solid-state dye-sensitized solar cells" *Journal of Photochemistry and Photobiology A: Chemistry*, Vol. 170, Issue 1 (2005), 1-6.

J. Kang, et al. "Polymer electrolytes from PEO and novel quaternary ammonium iodides for dye-sensitized solar cells" *Electrochimica Acta*, Vol. 48, Issue 17 (2003) 2487-2491.

G. Wang, et al. "Gel polymer electrolytes based on polyacrylonitrile and a novel quaternary ammonium salt for dye-sensitized solar cells" *Materials Research Bulletin* Vol. 39, Issue 13 (2004) 2113-2118.

X.-G. Sun, et al. "Comb-shaped single ion conductors based on polyacrylate ethers and lithium alkyl sulfonate" *Electrochimica Acta*, Vol. 50, Issue 5 (2005) 1139-1147.

H. Ohno, et al. "Development of new class of ion conductive polymers based on ionic liquids" *Electrochimica Acta*, Vol. 50, Issues 2-3 (2004) 255-261.

M. Morita, et al. "Ionic conductance behavior of polymeric gel electrolyte containing ionic liquid mixed with magnesium salt" *Journal of Power Sources*, Vol. 139, Issues 1-2 (2005) 351-355.

What is claimed is:

1. An electrochromic device, comprising:
   (i) a conductive layer,
   (ii) an electrochromic material, on the conductive layer
   (iii) an electrolyte, on the electrochromic material, and
   (iv) a counter-electrode, on the electrolyte,
   wherein the conductive layer has a surface roughness factor (SRF) of at least 10,
   the conductive layer comprises an n-type degenerate semiconductor, and
   the electrochromic device has a response time of at most 500 ms.

2. The electrochromic device of claim 1, wherein the electrochromic material is an organic electrochromic material.

3. The electrochromic device of claim 1, wherein the conductive layer has a SRF of at least 100.

4. The electrochromic device of claim 1, wherein the conductive layer is transparent.

5. The electrochromic device of claim 1, wherein the n-type degenerate semiconductor comprises at least one member selected from the group consisting of fluorinated tin oxide, aluminum-zinc oxide, antimony-tin oxide and indium-tin oxide.

6. The electrochromic device of claim 1, wherein the electrochromic material is a viologen.

7. The electrochromic device of claim 1, further comprising a substrate, and the conductive layer is on the substrate.

8. The electrochromic device of claim 1, wherein the electrolyte comprises one member selected from the group consisting of liquid electrolytes and polymer electrolytes.

9. The electrochromic device of claim 1, wherein the electrolyte comprises one member selected from the group consisting of liquid electrolytes and ionic liquid electrolytes.

10. The electrochromic device of claim 1, wherein the electrolyte comprises a non-aqueous solvent.

11. The electrochromic device of claim 1, wherein the electrolyte comprises a salt.

12. The electrochromic device of claim 1, further comprising a transparent substrate, and the conductive layer is on the substrate,
    wherein the electrochromic material is an organic electrochromic material,
    the conductive layer has a SRF of at least 400, and
    the n-type degenerate semiconductor comprises at least one
    member selected from the group consisting of fluorinated tin oxide, aluminum-zinc
    oxide, antimony-tin oxide and indium-tin oxide.

13. The electrochromic device of claim 1, having a coloring voltage of at most 1V.

14. An electrochromic display, comprising a plurality of the electrochromic devices of claim 1.

15. The electrochromic display of claim 14, wherein the plurality of electrochromic devices comprises electrochromic materials having at least 3 different colors.

16. An electrochromic device, comprising:
(i) a conductive layer,
(ii) an electrochromic material, on the conductive layer
(iii) an electrolyte, on the electrochromic material, and
(iv) a counter-electrode, on the electrolyte,
wherein the conductive layer has a surface roughness factor (SRF) of at least 10,
the electrochromic material is not Ni oxide or hydroxide,
the conductive layer comprises an n-type degenerate semiconductor, and
the electrochromic device has a response time of at most 500 ms.

17. The electrochromic device of claim 16, wherein the conductive layer is transparent.

18. The electrochromic device of claim 16, wherein the electrochromic material is a viologen.

19. The electrochromic device of claim 16, having a coloring voltage of at most 1V.

20. A process of preparing an electrochromic device, comprising:
forming a conductive layer, having a SRF of at least 10,
applying an electrochromic material onto the conductive layer, and
preparing the electrochromic device using the conductive layer and the
electrochromic material,
wherein the electrochromic device comprises:
(i) a conductive layer,
(ii) an electrochromic material, on the conductive layer
(iii) an electrolyte, on the electrochromic material, and
(iv) a counter-electrode, on the electrolyte,
the conductive layer comprises an n-type degenerate semiconductor, and
the electrochromic device has a response time of at most 500 ms.

21. The process of preparing an electrochromic device of claim 20, wherein the electrochromic material is an organic electrochromic material.

22. The process of preparing an electrochromic device of claim 20, wherein the n-type degenerate semiconductor comprises at least one member selected from the group consisting of fluorinated tin oxide, aluminum-zinc oxide, antimony-tin oxide and indium-tin oxide.

23. The process of preparing an electrochromic device of claim 20, wherein the electrochromic device has a coloring voltage of at most 1V.

* * * * *

UNITED STATES PATENT AND TRADEMARK OFFICE
CERTIFICATE OF CORRECTION

PATENT NO. : 10,281,791 B2
APPLICATION NO. : 15/208402
DATED : May 7, 2019
INVENTOR(S) : Xu

Page 1 of 1

It is certified that error appears in the above-identified patent and that said Letters Patent is hereby corrected as shown below:

In the Claims

Column 12, Line 5, please delete "a" and replace with --the--

Column 12, Line 6, please delete "an" and replace with --the--

Signed and Sealed this
Twenty-first Day of April, 2020

Andrei Iancu
*Director of the United States Patent and Trademark Office*